United States Patent
Corbin et al.

(10) Patent No.: US 9,959,087 B2
(45) Date of Patent: May 1, 2018

(54) MEDIA ITEM CONTEXT FROM SOCIAL MEDIA

(71) Applicant: Sonos, Inc., Santa Barbara, CA (US)

(72) Inventors: Keith Corbin, Santa Barbara, CA (US); Abhishek Kumar, Santa Barbara, CA (US); Ron Kuper, Arlington, MA (US); Gregory Paul Ramsperger, Somerville, MA (US); Andrej Sarkic, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 13 days.

(21) Appl. No.: 14/495,659

(22) Filed: Sep. 24, 2014

(65) Prior Publication Data
US 2016/0085500 A1    Mar. 24, 2016

(51) Int. Cl.
*G06F 3/16*        (2006.01)
*G05B 15/02*    (2006.01)
(Continued)

(52) U.S. Cl.
CPC .............. *G06F 3/165* (2013.01); *G05B 15/02* (2013.01); *G06Q 50/01* (2013.01); *H04L 51/32* (2013.01)

(58) Field of Classification Search
CPC .......... G06F 3/165; G06Q 50/01; H04L 51/32
(Continued)

(56) References Cited

U.S. PATENT DOCUMENTS 4,296,278 A    10/1981 Cullison et al.
4,816,989 A    3/1989 Finn et al.
(Continued)

FOREIGN PATENT DOCUMENTS

| EP | 0251584 A2 | 1/1988 |
|---|---|---|
| EP | 0672985 A1 | 9/1995 |
| EP | 1111527 A2 | 6/2001 |
| EP | 1389853 A1 | 2/2004 |

(Continued)

OTHER PUBLICATIONS

International Searching Authority, International Search Report and Written Opinion dated Dec. 16, 2015, issued in connection with International Application No. PCT/US2015/051989 filed Sep. 24, 2015, 11 pages.

(Continued)

*Primary Examiner* — Paul McCord
(74) *Attorney, Agent, or Firm* — McDonnell Boehnen Hulbert & Berghoff LLP

(57) ABSTRACT

Embodiments are described herein that may include a computing device. The computing device may receive an indication of a particular media item that is currently playing on a media playback system. The computing system may query a social media service for one or more accounts of the social media service that are connected within a social network to a particular account of the social media service that is registered to the media playback system and have received respective indications of the particular media item from respective media playback systems within a particular period of time. The computing system may receive data indicating the queried one or more accounts of the social media service and cause one or more respective indications of the received one or more accounts of the social media service to be displayed on a graphical interface in association with an indication of the particular media item.

20 Claims, 10 Drawing Sheets

(51) Int. Cl.
  *G06Q 50/00* (2012.01)
  *H04L 12/58* (2006.01)
(58) Field of Classification Search
  USPC .......................................................... 700/94
  See application file for complete search history.

(56) References Cited

U.S. PATENT DOCUMENTS

| | | | |
|---|---|---|---|
| 5,182,552 A | 1/1993 | Paynting | |
| 5,239,458 A | 8/1993 | Suzuki | |
| 5,299,266 A | 3/1994 | Lumsden | |
| 5,406,634 A | 4/1995 | Anderson et al. | |
| 5,440,644 A | 8/1995 | Farinelli et al. | |
| 5,467,342 A | 11/1995 | Logston et al. | |
| 5,491,839 A | 2/1996 | Schotz | |
| 5,553,222 A | 9/1996 | Milne et al. | |
| 5,563,946 A | 10/1996 | Cooper et al. | |
| 5,668,884 A | 9/1997 | Clair, Jr. et al. | |
| 5,673,323 A | 9/1997 | Schotz et al. | |
| 5,751,819 A | 5/1998 | Dorrough | |
| 5,761,320 A | 6/1998 | Farinelli et al. | |
| 5,774,666 A | 6/1998 | Portuesi | |
| 5,808,662 A | 9/1998 | Kinney et al. | |
| 5,815,689 A | 9/1998 | Shaw et al. | |
| 5,856,827 A | 1/1999 | Sudo | |
| 5,867,691 A | 2/1999 | Shiraishi | |
| 5,875,354 A | 2/1999 | Charlton et al. | |
| 5,887,143 A | 3/1999 | Saito et al. | |
| 5,923,902 A | 7/1999 | Inagaki | |
| 5,946,343 A | 8/1999 | Schotz et al. | |
| 5,956,088 A | 9/1999 | Shen et al. | |
| 6,002,862 A | 12/1999 | Takaike | |
| 6,009,457 A | 12/1999 | Moller | |
| 6,026,150 A | 2/2000 | Frank et al. | |
| 6,031,818 A | 2/2000 | Lo et al. | |
| 6,032,202 A | 2/2000 | Lea et al. | |
| 6,108,686 A | 8/2000 | Williams, Jr. | |
| 6,128,318 A | 10/2000 | Sato | |
| 6,157,957 A | 12/2000 | Berthaud | |
| 6,175,872 B1 | 1/2001 | Neumann et al. | |
| 6,181,316 B1 | 1/2001 | Little et al. | |
| 6,185,737 B1 | 2/2001 | Northcutt et al. | |
| 6,195,436 B1 | 2/2001 | Scibora et al. | |
| 6,199,169 B1 | 3/2001 | Voth | |
| 6,255,961 B1 | 7/2001 | Van Ryzin et al. | |
| 6,256,554 B1 | 7/2001 | Dilorenzo | |
| 6,308,207 B1 | 10/2001 | Tseng et al. | |
| 6,324,586 B1 | 11/2001 | Johnson | |
| 6,332,147 B1 | 12/2001 | Moran et al. | |
| 6,349,339 B1 | 2/2002 | Williams | |
| 6,351,821 B1 | 2/2002 | Voth | |
| 6,404,811 B1 | 6/2002 | Cvetko et al. | |
| 6,430,353 B1 | 8/2002 | Honda et al. | |
| 6,469,633 B1 | 10/2002 | Wachter | |
| 6,487,296 B1 | 11/2002 | Allen et al. | |
| 6,522,886 B1 | 2/2003 | Youngs et al. | |
| 6,526,325 B1 | 2/2003 | Sussman et al. | |
| 6,587,127 B1 | 7/2003 | Leeke et al. | |
| 6,594,691 B1 | 7/2003 | McCollum et al. | |
| 6,598,172 B1 | 7/2003 | Vandeusen et al. | |
| 6,611,537 B1 | 8/2003 | Edens et al. | |
| 6,631,410 B1 | 10/2003 | Kowalski et al. | |
| 6,674,803 B1 | 1/2004 | Kesselring | |
| 6,728,531 B1 | 4/2004 | Lee et al. | |
| 6,732,155 B2 | 5/2004 | Meek | |
| 6,757,517 B2 | 6/2004 | Chang | |
| 6,778,869 B2 | 8/2004 | Champion | |
| 6,826,283 B1 | 11/2004 | Wheeler et al. | |
| 6,836,788 B2 | 12/2004 | Kim et al. | |
| 6,898,642 B2 | 5/2005 | Chafle et al. | |
| 6,912,610 B2 | 6/2005 | Spencer | |
| 6,920,373 B2 | 7/2005 | Xi et al. | |
| 6,934,766 B1 | 8/2005 | Russell | |
| 6,985,694 B1 | 1/2006 | De et al. | |
| 7,007,106 B1 | 2/2006 | Flood et al. | |
| 7,017,118 B1 | 3/2006 | Carroll | |
| 7,020,048 B2 | 3/2006 | McComas | |
| 7,020,791 B1 | 3/2006 | Aweya et al. | |
| 7,043,651 B2 | 5/2006 | Aweya et al. | |
| 7,047,308 B2 | 5/2006 | Deshpande | |
| 7,113,833 B1 | 9/2006 | Brown et al. | |
| 7,113,999 B2 | 9/2006 | Pestoni et al. | |
| 7,115,017 B1 | 10/2006 | Laursen et al. | |
| 7,117,451 B2 | 10/2006 | Sielken | |
| 7,124,125 B2 | 10/2006 | Cook et al. | |
| 7,130,608 B2 | 10/2006 | Hollstrom et al. | |
| 7,130,616 B2 | 10/2006 | Janik | |
| 7,143,141 B1 | 11/2006 | Morgan et al. | |
| 7,143,939 B2 | 12/2006 | Henzerling | |
| 7,162,315 B2 | 1/2007 | Gilbert | |
| 7,185,090 B2 | 2/2007 | Kowalski et al. | |
| 7,187,947 B1 | 3/2007 | White et al. | |
| 7,206,367 B1 | 4/2007 | Moore | |
| 7,209,795 B2 | 4/2007 | Sullivan et al. | |
| 7,218,708 B2 | 5/2007 | Berezowski et al. | |
| 7,236,739 B2 | 6/2007 | Chang | |
| 7,236,773 B2 | 6/2007 | Thomas | |
| 7,281,034 B1 | 10/2007 | Eyal | |
| 7,293,060 B2 | 11/2007 | Komsi | |
| 7,295,548 B2 | 11/2007 | Blank et al. | |
| 7,302,468 B2 * | 11/2007 | Wijeratne | G06Q 30/02 446/297 |
| 7,312,785 B2 | 12/2007 | Tsuk et al. | |
| 7,324,857 B2 | 1/2008 | Goddard | |
| 7,333,519 B2 | 2/2008 | Sullivan et al. | |
| 7,358,960 B2 | 4/2008 | Mak | |
| 7,372,846 B2 | 5/2008 | Zwack | |
| 7,391,791 B2 | 6/2008 | Balassanian et al. | |
| 7,392,102 B2 | 6/2008 | Sullivan et al. | |
| 7,483,538 B2 | 1/2009 | McCarty et al. | |
| 7,483,958 B1 | 1/2009 | Elabbady et al. | |
| 7,496,623 B2 | 2/2009 | Szeto et al. | |
| 7,496,633 B2 | 2/2009 | Szeto et al. | |
| 7,571,014 B1 * | 8/2009 | Lambourne | H04R 27/00 700/94 |
| 7,574,274 B2 | 8/2009 | Holmes | |
| 7,599,685 B2 | 10/2009 | Goldberg et al. | |
| 7,630,501 B2 | 12/2009 | Blank et al. | |
| 7,643,894 B2 | 1/2010 | Braithwaite et al. | |
| 7,657,224 B2 | 2/2010 | Goldberg et al. | |
| 7,657,644 B1 | 2/2010 | Zheng | |
| 7,657,910 B1 | 2/2010 | McAulay et al. | |
| 7,668,990 B2 | 2/2010 | Krzyzanowski et al. | |
| 7,669,219 B2 | 2/2010 | Scott | |
| 7,675,943 B2 | 3/2010 | Mosig | |
| 7,676,142 B1 | 3/2010 | Hung | |
| 7,702,279 B2 | 4/2010 | Ko et al. | |
| 7,720,096 B2 | 5/2010 | Klemets | |
| 7,725,533 B2 | 5/2010 | Szeto et al. | |
| 7,725,551 B2 | 5/2010 | Szeto et al. | |
| 7,739,271 B2 | 6/2010 | Cook et al. | |
| 7,742,740 B2 | 6/2010 | Goldberg et al. | |
| 7,788,138 B2 | 8/2010 | Viehmann et al. | |
| 7,805,682 B1 | 9/2010 | Lambourne | |
| 7,835,689 B2 | 11/2010 | Goldberg et al. | |
| 7,853,341 B2 | 12/2010 | McCarty et al. | |
| 7,865,137 B2 | 1/2011 | Goldberg et al. | |
| 7,885,622 B2 | 2/2011 | Krampf et al. | |
| 7,916,877 B2 | 3/2011 | Goldberg et al. | |
| 7,917,082 B2 | 3/2011 | Goldberg et al. | |
| 7,921,369 B2 | 4/2011 | Bill | |
| 7,934,239 B1 | 4/2011 | Dagman | |
| 7,987,294 B2 | 7/2011 | Bryce et al. | |
| 7,996,566 B1 | 8/2011 | Sylvain et al. | |
| 8,014,423 B2 | 9/2011 | Thaler et al. | |
| 8,023,663 B2 | 9/2011 | Goldberg | |
| 8,028,038 B2 | 9/2011 | Weel | |
| 8,028,323 B2 | 9/2011 | Weel | |
| 8,045,952 B2 | 10/2011 | Qureshey et al. | |
| 8,050,652 B2 | 11/2011 | Qureshey et al. | |
| 8,074,253 B1 | 12/2011 | Nathan | |
| 8,086,752 B2 | 12/2011 | Millington et al. | |
| 8,103,009 B2 | 1/2012 | McCarty et al. | |
| 8,112,032 B2 | 2/2012 | Ko et al. | |

(56) References Cited

U.S. PATENT DOCUMENTS

| | | |
|---|---|---|
| 8,131,390 B2 | 3/2012 | Braithwaite et al. |
| 8,169,938 B2 | 5/2012 | Duchscher et al. |
| 8,200,602 B2 | 6/2012 | Farrelly |
| 8,214,873 B2 | 7/2012 | Weel |
| 8,230,099 B2 | 7/2012 | Weel |
| 8,234,395 B2 | 7/2012 | Millington |
| 8,271,115 B2* | 9/2012 | Yoshida ............ G06F 17/30035 700/94 |
| 8,290,603 B1 | 10/2012 | Lambourne |
| 8,315,555 B2 | 11/2012 | Ko et al. |
| 8,370,678 B2 | 2/2013 | Millington et al. |
| 8,423,659 B2 | 4/2013 | Millington |
| 8,483,853 B1 | 7/2013 | Lambourne |
| 8,521,316 B2 | 8/2013 | Louboutin |
| 8,588,949 B2 | 11/2013 | Lambourne et al. |
| 8,613,385 B1 | 12/2013 | Hulet et al. |
| 8,666,826 B2* | 3/2014 | Narayanan ............ G06Q 10/10 705/26.1 |
| 8,775,546 B2 | 7/2014 | Millington |
| 8,843,500 B2 | 9/2014 | Nogues et al. |
| 8,892,648 B1 | 11/2014 | Durham et al. |
| 8,942,252 B2 | 1/2015 | Balassanian et al. |
| 8,990,701 B2 | 3/2015 | Olofsson |
| 9,052,810 B2 | 6/2015 | Reimann et al. |
| 9,137,564 B2 | 9/2015 | Reimann |
| 9,246,866 B1* | 1/2016 | Sanders ............ G06Q 30/0201 |
| 9,247,363 B2 | 1/2016 | Triplett et al. |
| 9,344,292 B2 | 5/2016 | Griffiths et al. |
| 9,489,383 B2 | 11/2016 | Hyman et al. |
| 9,510,055 B2 | 11/2016 | Kuper et al. |
| 9,696,874 B2 | 7/2017 | Kulick et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0054134 A1* | 5/2002 | Kelts ............ G06F 3/0481 715/788 |
| 2002/0056117 A1 | 5/2002 | Hasegawa et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0116476 A1 | 8/2002 | Eyal et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassetti et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0099212 A1 | 5/2003 | Anjum et al. |
| 2003/0099221 A1 | 5/2003 | Rhee |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty |
| 2003/0220973 A1 | 11/2003 | Zhu et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0108320 A1 | 5/2005 | Lord et al. |
| 2005/0114538 A1 | 5/2005 | Rose |
| 2005/0125357 A1 | 6/2005 | Saadat et al. |
| 2005/0166157 A1 | 7/2005 | Ollis et al. |
| 2005/0177643 A1 | 8/2005 | Xu |
| 2005/0181348 A1 | 8/2005 | Carey et al. |
| 2005/0195205 A1 | 9/2005 | Abrams |
| 2005/0201254 A1 | 9/2005 | Looney et al. |
| 2005/0234875 A1 | 10/2005 | Auerbach et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0095516 A1 | 5/2006 | Wijeratne |
| 2006/0107237 A1 | 5/2006 | Kim |
| 2006/0119497 A1 | 6/2006 | Miller et al. |
| 2006/0143236 A1 | 6/2006 | Wu |
| 2006/0168340 A1 | 7/2006 | Heller et al. |
| 2006/0195462 A1 | 8/2006 | Rogers |
| 2006/0195479 A1 | 8/2006 | Spiegelman et al. |
| 2006/0195480 A1 | 8/2006 | Spiegelman et al. |
| 2006/0253436 A1 | 11/2006 | Cook et al. |
| 2006/0253782 A1 | 11/2006 | Stark et al. |
| 2006/0294074 A1 | 12/2006 | Chang |
| 2007/0033402 A1 | 2/2007 | Williams et al. |
| 2007/0038999 A1 | 2/2007 | Millington |
| 2007/0043847 A1 | 2/2007 | Carter et al. |
| 2007/0048713 A1 | 3/2007 | Plastina et al. |
| 2007/0054680 A1 | 3/2007 | Mo et al. |
| 2007/0088747 A1 | 4/2007 | Cheng et al. |
| 2007/0136778 A1 | 6/2007 | Birger et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0169115 A1 | 7/2007 | Ko et al. |
| 2007/0180137 A1 | 8/2007 | Rajapakse |
| 2007/0214182 A1 | 9/2007 | Rosenberg |
| 2007/0224937 A1 | 9/2007 | Jung et al. |
| 2007/0271388 A1 | 11/2007 | Bowra et al. |
| 2007/0288470 A1 | 12/2007 | Kauniskangas et al. |
| 2007/0294131 A1 | 12/2007 | Roman et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0052371 A1 | 2/2008 | Partovi et al. |

(56) References Cited

U.S. PATENT DOCUMENTS

| | | |
|---|---|---|
| 2008/0059510 A1 | 3/2008 | Cardamore et al. |
| 2008/0077261 A1* | 3/2008 | Baudino ............... H04H 20/63 700/94 |
| 2008/0091771 A1 | 4/2008 | Allen et al. |
| 2008/0109529 A1 | 5/2008 | Story |
| 2008/0120429 A1 | 5/2008 | Millington |
| 2008/0144861 A1 | 6/2008 | Melanson et al. |
| 2008/0152165 A1* | 6/2008 | Zacchi .................... H04R 5/04 381/77 |
| 2008/0154959 A1 | 6/2008 | Dunko |
| 2008/0194276 A1 | 8/2008 | Lin et al. |
| 2008/0301280 A1 | 12/2008 | Chasen |
| 2009/0031336 A1 | 1/2009 | Chavez et al. |
| 2009/0041423 A1 | 2/2009 | Weber et al. |
| 2009/0063414 A1 | 3/2009 | White et al. |
| 2009/0076881 A1 | 3/2009 | Svendsen |
| 2009/0150806 A1 | 6/2009 | Evje et al. |
| 2009/0157905 A1 | 6/2009 | Davis |
| 2009/0179867 A1 | 7/2009 | Shim et al. |
| 2009/0222115 A1 | 9/2009 | Malcolm et al. |
| 2009/0228919 A1 | 9/2009 | Zott et al. |
| 2009/0265426 A1 | 10/2009 | Svendsen et al. |
| 2009/0307062 A1 | 12/2009 | Lutnick et al. |
| 2009/0313369 A1 | 12/2009 | Wormington et al. |
| 2010/0010648 A1 | 1/2010 | Bull et al. |
| 2010/0017366 A1 | 1/2010 | Robertson et al. |
| 2010/0017714 A1 | 1/2010 | Agarwal et al. |
| 2010/0031366 A1 | 2/2010 | Knight et al. |
| 2010/0036950 A1 | 2/2010 | Bae et al. |
| 2010/0049835 A1 | 2/2010 | Ko et al. |
| 2010/0054275 A1 | 3/2010 | Noonan et al. |
| 2010/0082731 A1 | 4/2010 | Haughay et al. |
| 2010/0094834 A1 | 4/2010 | Svendsen |
| 2010/0095332 A1 | 4/2010 | Gran et al. |
| 2010/0131567 A1 | 5/2010 | Dorogusker et al. |
| 2010/0205222 A1 | 8/2010 | Gajdos et al. |
| 2010/0228740 A1 | 9/2010 | Cannistraro et al. |
| 2010/0262909 A1 | 10/2010 | Hsieh |
| 2010/0284389 A1 | 11/2010 | Ramsay et al. |
| 2010/0299391 A1 | 11/2010 | Demarta et al. |
| 2010/0299639 A1 | 11/2010 | Ramsay et al. |
| 2010/0318917 A1 | 12/2010 | Holladay et al. |
| 2011/0004330 A1 | 1/2011 | Rothkopf et al. |
| 2011/0066943 A1 | 3/2011 | Brillon et al. |
| 2011/0087842 A1 | 4/2011 | Lu et al. |
| 2011/0119706 A1 | 5/2011 | Scott et al. |
| 2011/0154173 A1 | 6/2011 | Herlein |
| 2011/0196888 A1 | 8/2011 | Hanson et al. |
| 2011/0202430 A1 | 8/2011 | Narayanan et al. |
| 2011/0202842 A1 | 8/2011 | Weatherly et al. |
| 2011/0211534 A1 | 9/2011 | Schmidt et al. |
| 2011/0225417 A1 | 9/2011 | Maharajh et al. |
| 2011/0264732 A1 | 10/2011 | Robbin et al. |
| 2011/0314388 A1* | 12/2011 | Wheatley ............... G11B 27/034 715/751 |
| 2012/0029671 A1 | 2/2012 | Millington et al. |
| 2012/0030366 A1 | 2/2012 | Collart et al. |
| 2012/0054278 A1 | 3/2012 | Taleb et al. |
| 2012/0060046 A1 | 3/2012 | Millington |
| 2012/0071996 A1 | 3/2012 | Svendsen |
| 2012/0096526 A1 | 4/2012 | Brahmanapalli et al. |
| 2012/0117168 A1 | 5/2012 | Sugiyama et al. |
| 2012/0117185 A1 | 5/2012 | Cassidy |
| 2012/0117586 A1 | 5/2012 | McCoy et al. |
| 2012/0129446 A1 | 5/2012 | Ko et al. |
| 2012/0151320 A1 | 6/2012 | McClements, IV |
| 2012/0159393 A1 | 6/2012 | Sethi et al. |
| 2012/0206623 A1 | 8/2012 | Nakama |
| 2012/0210205 A1 | 8/2012 | Sherwood et al. |
| 2012/0233067 A1 | 9/2012 | Matthew et al. |
| 2012/0233639 A1 | 9/2012 | Zott et al. |
| 2012/0272156 A1 | 10/2012 | Kerger et al. |
| 2012/0284423 A1 | 11/2012 | Weel |
| 2012/0311635 A1 | 12/2012 | Mushkatblat |
| 2012/0315884 A1 | 12/2012 | Forutanpour et al. |
| 2013/0007617 A1 | 1/2013 | MacKenzie et al. |
| 2013/0024880 A1 | 1/2013 | Moloney-Egnatios et al. |
| 2013/0031162 A1 | 1/2013 | Willis et al. |
| 2013/0061296 A1 | 3/2013 | Reddy et al. |
| 2013/0070093 A1 | 3/2013 | Rivera et al. |
| 2013/0073584 A1 | 3/2013 | Kuper et al. |
| 2013/0080599 A1 | 3/2013 | Ko et al. |
| 2013/0080955 A1 | 3/2013 | Reimann et al. |
| 2013/0128038 A1 | 5/2013 | Cok et al. |
| 2013/0129232 A1 | 5/2013 | Cok et al. |
| 2013/0130729 A1 | 5/2013 | Cok et al. |
| 2013/0159858 A1* | 6/2013 | Joffray ............... H04N 21/4788 715/719 |
| 2013/0173034 A1* | 7/2013 | Reimann ........... G06F 17/30761 700/94 |
| 2013/0174204 A1 | 7/2013 | Coburn, IV et al. |
| 2013/0191454 A1* | 7/2013 | Oliver ................... G06Q 10/10 709/204 |
| 2013/0198633 A1 | 8/2013 | Hyman |
| 2013/0246522 A1 | 9/2013 | Bilinski et al. |
| 2013/0246916 A1 | 9/2013 | Reimann et al. |
| 2013/0254207 A1 | 9/2013 | Coburn, IV et al. |
| 2013/0254663 A1 | 9/2013 | Bates et al. |
| 2013/0310316 A1 | 11/2013 | Hellstrom et al. |
| 2013/0339397 A1 | 12/2013 | Herasymchuk |
| 2013/0343567 A1 | 12/2013 | Triplett et al. |
| 2013/0346859 A1 | 12/2013 | Bates et al. |
| 2014/0047074 A1 | 2/2014 | Chung et al. |
| 2014/0075308 A1 | 3/2014 | Sanders et al. |
| 2014/0075316 A1 | 3/2014 | Li |
| 2014/0081796 A1 | 3/2014 | Cohen |
| 2014/0093219 A1 | 4/2014 | Trivedi |
| 2014/0096219 A1 | 4/2014 | Lang et al. |
| 2014/0115061 A1 | 4/2014 | Reddy et al. |
| 2014/0122590 A1 | 5/2014 | Svendsen |
| 2014/0181655 A1 | 6/2014 | Kumar et al. |
| 2014/0204076 A1 | 7/2014 | Kuper et al. |
| 2014/0208205 A1 | 7/2014 | Bartholomew |
| 2014/0237361 A1 | 8/2014 | Martin et al. |
| 2014/0244863 A1 | 8/2014 | Bradley et al. |
| 2014/0310058 A1 | 10/2014 | Aral et al. |
| 2014/0310779 A1 | 10/2014 | Lof et al. |
| 2014/0330951 A1 | 11/2014 | Sukoff et al. |
| 2014/0337959 A1 | 11/2014 | Garmark et al. |
| 2014/0341528 A1 | 11/2014 | Mahate et al. |
| 2015/0046458 A1* | 2/2015 | Hu .................... G06F 17/30029 707/738 |
| 2015/0067054 A1 | 3/2015 | Yoo et al. |
| 2015/0067871 A1 | 3/2015 | Commons et al. |
| 2015/0095680 A1 | 4/2015 | Gossain et al. |
| 2015/0185599 A1 | 7/2015 | Mullins |
| 2015/0186110 A1 | 7/2015 | Kannan |
| 2015/0220498 A1 | 8/2015 | Munoz et al. |
| 2015/0286360 A1 | 10/2015 | Wachter |
| 2016/0063011 A1* | 3/2016 | Wehbi ................. G06Q 30/0256 707/711 |
| 2016/0180248 A1 | 6/2016 | Regan |
| 2017/0169522 A1 | 6/2017 | Hyman et al. |

FOREIGN PATENT DOCUMENTS

| | | |
|---|---|---|
| JP | 2011128957 | 6/2011 |
| KR | 20010090215 | 10/2001 |
| KR | 20050051785 | 6/2005 |
| KR | 1020070040592 | 4/2007 |
| KR | 20070048922 | 5/2007 |
| KR | 100890993 | 3/2009 |
| KR | 20100060498 A | 6/2010 |
| KR | 20100071724 | 6/2010 |
| KR | 20100134164 | 12/2010 |
| KR | 20110064635 | 6/2011 |
| KR | 20130083012 A | 7/2013 |
| WO | 199525313 | 9/1995 |
| WO | 199961985 | 12/1999 |
| WO | 200147248 | 6/2001 |
| WO | 0153994 | 7/2001 |

(56) References Cited

FOREIGN PATENT DOCUMENTS

| WO | 2002052540 | | 7/2002 |
|---|---|---|---|
| WO | 2003093950 | A2 | 11/2003 |
| WO | 2005013047 | A2 | 2/2005 |
| WO | 2007023120 | A1 | 3/2007 |
| WO | 2010018429 | A1 | 2/2010 |
| WO | 2011100264 | A3 | 11/2011 |
| WO | 2011157891 | A1 | 12/2011 |
| WO | 2012056326 | A2 | 5/2012 |
| WO | 2012106269 | | 8/2012 |
| WO | 2013139239 | A1 | 9/2013 |
| WO | 2014004181 | | 1/2014 |
| WO | 201411669 | A1 | 7/2014 |
| WO | 2014145746 | | 9/2014 |

OTHER PUBLICATIONS

"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
"Bluetooth. "Specification of the Bluetooth System: The ad hoc SCATTERNET for affordable and highly functional wireless connectivity" Core, Version 1.0 A, Jul. 26, 1999, 1068 pages". (in four parts due to size).
"Bluetooth. "Specification of the Bluetooth System: Wireless connections made easy" Core, Version 1.0 B, Dec. 1, 1999, 1076 pages". (in four parts due to size).
Buskirk; Eliot Van., "Music Needs 'Connective Tissue' and Facebook Wants to Build it", Evolver-1m, http://evolver.fm/2011/09/01/music-needs-connective-tissue-and-facebook-wants-to-build-iti, Sep. 1, 2011, 6 pages.
Co-pending U.S. Appl. No. US201314042160, filed on Sep. 30, 2013.
Co-pending U.S. Appl. No. US201414263729, filed on Apr. 28, 2014.
Co-pending U.S. Appl. No. US201414263743, filed on Apr. 28, 2014.
Co-pending U.S. Appl. No. US201414263750, filed on Apr. 28, 2014.
Co-pending U.S. Appl. No. US201414263777, filed on Apr. 28, 2014.
"Dell, Inc. "Dell Digital Audio Receiver: Reference Guide" Jun. 2000, 70 pages.". (in two parts due to size).
"Dell, Inc. "Start Here" Jun. 2000, 2 pages".
"International Preliminary Report on Patentability and Written Opinion, issued by the International Searching Authority in connection with International patent application No. PCT/US2012/056467 dated Apr. 3, 2014, 11 pages."
"International Search Report for Application No. PCT/US2012/056467, dated Feb. 28, 2013".
Jo J., et al., "Synchronized One-to-many Media Streaming with Adaptive Playout Control," Proceedings of SPIE, 2002, vol. 4861, pp. 71-82.
"Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages".
"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".
"Palm, Inc. "Handbook for the Palm VII Handheld" May 2000, 311 pages".
"UPnP; "Universal Plug and Play Device Architecture"; Jun. 8, 2000; version 1.0; Microsoft Corporation; pp. 1-54".
"Presentations at WinHEC 2000" May 2000, 138 pages.

Non-Final Office Action dated Sep. 10, 2015, issued in connection with U.S. Appl. No. 14/197,403, filed Mar. 5, 2014, 16 pages.
Non-Final Office Action dated Jan. 12, 2017, issued in connection with U.S. Appl. No. 14/275,112, filed May 12, 2014, 25 pages.
Non-Final Office Action dated Dec. 17, 2015, issued in connection with U.S. Appl. No. 14/173,253, filed Feb. 5, 2014, 18 pages.
Non-Final Office Action dated Jun. 17, 2016, issued in connection with U.S. Appl. No. 14/495,706, filed Sep. 24, 2014, 19 pages.
Non-Final Office Action dated May 18, 2016, issued in connection with U.S. Appl. No. 14/197,403, filed Mar. 5, 2014, 21 pages.
North American MPEG-2 Information, "The MPEG-2 Transport Stream," Retrieved from the Internet:, 2006, pp. 1-5.
Notice of Allowance dated May 4, 2016, issued in connection with U.S. Appl. No. 13/748,357, filed Jan. 23, 2013, 11 pages.
Notice of Allowance dated Dec. 12, 2016, issued in connection with U.S. Appl. No. 14/495,595, filed Sep. 24, 2014, 5 pages.
Notice of Allowance dated Dec. 29, 2016, issued in connection with U.S. Appl. No. 14/197,403, filed Mar. 5, 2014, 5 pages.
Park et al., "Group Synchronization in MultiCast Media Communications," Proceedings of the 5th Research on Multicast Technology Workshop, 2003, 5 pages.
Polycom Conference Composer manual: copyright 2001.
Preinterview First Office Action dated May 4, 2016, issued in connection with U.S. Appl. No. 14/455,651, filed Aug. 8, 2014, 7 pages.
Preinterview First Office Action dated May 5, 2016, issued in connection with U.S. Appl. No. 14/495,595, filed Sep. 24, 2014, 6 pages.
Preinterview First Office Action dated May 16, 2016, issued in connection with U.S. Appl. No. 14/495,633, filed Sep. 24, 2014, 6 pages.
Preinterview First Office Action dated Oct. 19, 2016, issued in connection with U.S. Appl. No. 14/821,513, filed Aug. 7, 2016, 5 pages.
Preinterview First Office Action dated May 23, 2016, issued in connection with U.S. Appl. No. 14/495,684, filed Sep. 24, 2014, 6 pages.
PRISMIQ, Inc., "PRISMIQ Media Player User Guide," 2003, 44 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
U.S. Appl. No. 12/070,933, filed Feb. 22, 2008. "System, Method, and Computer Program for Remotely Managing a Digital Device" Inventor: Jonathan Lang, et al.
U.S. Appl. No. 13/533,105, filed Jun. 26, 2012. "Systems, Methods, Apparatus, and Articles of Manufacture to Provide a Crowd-Sourced Playlist with Guess Access" Inventor: Paul Bates, et al.
U.S. Appl. No. 13/533,785, filed Jun. 26, 2012. "Networked Music Playback Including Remote Discovery and Add to Queue" Inventor: Mark Triplett, et al.
U.S. Appl. No. 13/748,357, filed Jan. 23, 2013 "System and Method for a Media Experience Social Interface" Inventor: Ron Kuper, et al.
U.S. Appl. No. 13/871,785, filed Apr. 26, 2013. "Systems, Methods, Apparatus, and Articles of Manufacture to Provide Guest Access" Inventor: Paul Bates, et al.
U.S. Appl. No. 13/871,795, filed Jun. 20, 2013. "Systems, Methods, Apparatus, and Articles of Manufacture to Provide Guest Access" Inventor: Paul Bates, et al.
U.S. Appl. No. 14/173,253, filed Feb. 5, 2014. "Remote Creation of a Playback Queue for a Future Event" Inventor: Jaime Munoz, et al.
Yamaha DME 32 manual: copyright 2001.
Yamaha DME 64 Owner's Manual; copyright 2004, 80 pages.
Yamaha DME Designer 3.5 setup manual guide; copyright 2004, 16 pages.

(56) References Cited

OTHER PUBLICATIONS

Yamaha DME Designer 3.5 User Manual; Copyright 2004, 507 pages.
Advisory Action dated Feb. 1, 2017, issued in connection with U.S. Appl. No. 14/297,193, filed Jun. 5, 2014, 6 pages.
Corrected Notice of Allowability dated Jan. 19, 2017, issued in connection with U.S. Appl. No. 14/197,403, filed Mar. 5, 2014, 2 pages.
European Patent Office, Examination Report dated Feb. 3, 2017, issued in connection with European Patent Application No. 14743335.3, 5 pages.
European Patent Office, Office Action dated Jan. 13, 2017, issued in connection with European Application No. 15781794.1, 8 pages.
Notice of Allowance dated Jan. 26, 2017, issued in connection with U.S. Appl. No. 14/495,706, filed Sep. 24, 2014, 8 pages.
Advisory Action dated Jul. 12, 2016, issued in connection with U.S. Appl. No. 14/173,253, filed Feb. 5, 2014, 5 pages.
Akyildiz et al., "Multimedia Group Synchronization Protocols for Integrated Services Networks," IEEE Journal on Selected Areas in Communications, 1996 pp. 162-173, vol. 14, No. 1.
Benslimane Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International conference on Multimedia Computing and Systems, 1996, pp. 372-381.
Bretl W.E., et al., MPEG2 Tutorial [online], 2000 [retrieved on Jan. 13, 2009] Retrieved from the Internet:, pp. 1-23.
European Patent Office, European Supplemental Search Report dated Jan. 27, 2016, issued in connection with European Application No. 14743335.3, 8 pages.
European Patent Office, Extended European Search Report dated Dec. 23, 2016, issued in connection with European Application No. 15746781.2, 10 pages.
Final Office Action dated Nov. 3, 2016, issued in connection with U.S. Appl. No. 14/495,684, filed Sep. 24, 2014, 16 pages.
Final Office Action dated Apr. 6, 2016, issued in connection with U.S. Appl. No. 14/173,253, filed Feb. 5, 2014, 20 pages.
Final Office Action dated Oct. 7, 2016, issued in connection with U.S. Appl. No. 14/495,595, filed Sep. 24, 2014, 16 pages.
Final Office Action dated Feb. 10, 2005, issued in connection with U.S. Appl. No. 14/197,403, filed Mar. 5, 2014, 21 pages
Final Office Action dated Sep. 16, 2016, issued in connection with U.S. Appl. No. 14/275,112, filed May 12, 2014, 19 pages.
Final Office Action dated Oct. 20, 2016, issued in connection with U.S. Appl. No. 14/197,403, filed Mar. 5, 2016, 17 pages.
Final Office Action dated Sep. 30, 2016, issued in connection with U.S. Appl. No. 14/297,193, filed Jun. 5, 2014, 34 pages.
First Action Interview Office Action dated Apr. 4, 2016, issued in connection with U.S. Appl. No. 14/275,112, filed May 12, 2014, 8 pages.
First Action Interview Office Action Jul. 7, 2016, issued in connection with U.S. Appl. No. 14/495,595, filed Sep. 24, 2014, 6 pages.
First Action Interview Office Action dated Jul. 11, 2016, issued in connection with U.S. Appl. No. 14/495,684, filed Sep. 24, 2014, 8 pages.
First Action Interview Office Action dated Jul. 13, 2016, issued in connection with U.S. Appl. No. 14/455,651, filed Aug. 8, 2014, 10 pages.
First Action Interview Office Action dated Oct. 13, 2016, issued in connection with U.S. Appl. No. 14/495,633, filed Sep. 24, 2014, 8 pages.
First Action Interview Office Action dated Dec. 14, 2016, issued in connection with U.S. Appl. No. 14/821,513, filed Aug. 7, 2015, 10 pages.
First Action Interview Pilot Program Pre-Interview Communication dated Oct. 28, 2015, issued in connection with U.S. Appl. No. 14/275,112, filed May 12, 2014, 4 pages.

Huang C.M., et al., "A Synchronization Infrastructure for Multicast Multimedia at the Presentation Layer," IEEE Transactions on Consumer Electronics, 1997, pp. 370-380, vol. 43, No. 3.
International Bureau, International Preliminary Report on Patentability dated Jan. 30, 2014, issued in connection with International Application No. PCT/US2012/047620, filed Jul. 20, 2012, 7 pages.
International Bureau, International Preliminary Report on Patentability, dated Aug. 6, 2015, issued in connection with International Application No. PCT/US2014/012534, filed Jan. 22, 2014, 6 pages.
International Bureau, International Preliminary Report on Patentability dated Aug. 18, 2016, issued in connection with International Application No. PCT/US2015/014156, filed Feb. 3, 2015, 10 pages.
International Bureau, International Preliminary Report on Patentability dated Sep. 15, 2016, issued in connection with International Application No. PCT/US2015/018850, filed Mar. 5, 2015, 10 pages.
International Bureau, International Preliminary Report on Patentability dated Dec. 15, 2016, issued in connection with International Application No. PCT/US2015/031934, filed May 21, 2015, 11 pages.
International Searching Authority, International Search Report and Written Opinion dated Nov. 6, 2015, issued in connection with International Application No. PCT/US2015/051993, filed Sep. 24, 2015, 10 pages.
International Searching Authority, International Search Report and Written Opinion dated Dec. 7, 2015, issued in connection with International Application No. PCT/US2015/051968, filed Sep. 24, 2015, 14 pages.
International Searching Authority, International Search Report and Written Opinion dated Dec. 21, 2015, issued in connection with International Application No. PCT/US2015/051983 filed Sep. 24, 2015, 11 pages.
International Searching Authority, International Search Report and Written Opinion dated Nov. 23, 2015, issued in connection with International Application No. PCT/US2015/051975, 14 pages.
International Searching Authority, International Search Report and Written Opinion dated Apr. 24, 2015, issued in connection with International Application No. PCT/US2015/014156, filed Feb. 3, 2015, 13 pages.
International Searching Authority, International Search Report and Written Opinion dated Aug. 27, 2015, issued in connection with International Application No. PCT/US2015/031934, filed May 21, 2015, 14 pages.
International Searching Authority, International Search Report and Written Opinion dated Nov. 27, 2015, issued in connection with International Application No. PCT/US2015/044218, filed Aug. 7, 2015, 13 pages.
International Searching Authority, International Search Report and Written Opinion dated May 29, 2015, issued in connection with International Application No. PCT/US2015/018850, filed Mar. 5, 2015, 13 pages.
International Searching Authority, International Search Report dated May 7, 2014, issued in connection with International Application No. PCT/US2014/012534, 3 pages.
International Searching Authority, International Search Report dated Dec. 27, 2012, issued in connection with International Application No. PCT/US2012/047620, filed Jul. 20, 2011, 3 pages.
International Searching Authority, Written Opinion dated Dec. 27, 2012, issued in connection with International Application No. PCT/US2012/047620, filed Jul. 20, 2011, 5 pages.
Ishibashi et al., "A Group Synchronization Mechanism for Live Media in Multicast Communications," IEEE Global Telecommunications Conference, 1997, pp. 746-752, vol. 2.
Ishibashi et al., "A Group Synchronization Mechanism for Stored Media in Multicast Communications," IEEE Information Revolution and Communications, 1997, pp. 692-700, vol. 2.
Japanese Patent Office, Notice of Rejection dated Nov. 8, 2016, issued in connection with Japanese Application No. 2015-555237, 6 pages.
"Denon 2003-2004 Product Catalog," Denon, 2003-2004, 44 pages.
Mills David L., "Network Time Protocol (Version 3) Specification, Implementation and Analysis," Network Working Group, Mar. 1992, 7 pages.

(56) References Cited

OTHER PUBLICATIONS

Mills, David L., "Precision Synchronization of Computer Network Clocks," ACM SIGCOMM Computer Communication Review, 1994, pp. 28-43, vol. 24, No. 2.
Motorola, "Simplefi, Wireless Digital Audio Receiver, Installation and User Guide," Dec. 31, 2001, 111 pages.
Nilsson, M., "ID3 Tag Version 2," Mar. 26,1998, 28 pages.
Non-Final Office Action dated Nov. 1, 2016, issued in connection with U.S. Appl. No. 14/173,253, filed Feb. 5, 2014, 21 pages.
Non-Final Office Action dated Oct. 1, 2015, issued in connection with U.S. Appl. No. 13/748,357, filed Jan. 23, 2013, 18 pages.
Non-Final Office Action dated Apr. 6, 2016, issued in connection with U.S. Appl. No. 14/297,193, filed Jun. 5, 2014, 26 pages.
Non-Final Office Action dated May 6, 2015, issued in connection with U.S. Appl. No. 13/748,357, filed Jan. 23, 2013, 17 pages.
Advisory Action dated Aug. 22, 2017, issued in connection with U.S. Appl. No. 14/173,253, filed Feb. 5, 2014, 4 pages.
European Patent Office, European Office Action dated Aug. 3, 2017, issued in connection with EP Application No. 15781794.1, 6 pages.
European Patent Office, Extended European Search Report dated Mar. 15, 2017, issued in connection with European Application No. 15758460.8, 9 pages.
European Patent Office, Office Action dated Mar. 2, 2017, issued in connection with European Application No. 15775566.1, 7 pages.
European Patent Office, Office Action dated Apr. 4, 2017, issued in connection with European Application No. 15775897.0, 6 pages.
European Patent Office, Office Action dated Mar. 13, 2017, issued in connection with European Application No. 15781200.9, 5 pages.
Final Office Action dated Feb. 7, 2017, issued in connection with U.S. Appl. No. 14/455,651, filed Aug. 8, 2014, 22 pages.
Final Office Action dated Feb. 16, 2017, issued in connection with U.S. Appl. No. 14/495,633, filed Sep. 24, 2014, 15 pages.
Final Office Action dated May 31, 2017, issued in connection with U.S. Appl. No. 14/173,253, filed Feb. 5, 2014, 22 pages.
Final Office Action dated May 31, 2017, issued in connection with U.S. Appl. No. 14/821,513, filed Aug. 7, 2015, 16 pages.
First Action Interview Pilot Program Pre-Interview Communication dated Apr. 3, 2017, issued in connection with U.S. Appl. No. 14/495,590, filed Sep. 24, 2014, 5 pages.
International Searching Authority, International Preliminary Report on Patentability dated Apr. 6, 2017, issued in connection with International Application No. PCT/US2015/051968 filed Sep. 24, 2015, 10 pages.
International Searching Authority, International Preliminary Report on Patentability dated Apr. 6, 2017, issued in connection with International Application No. PCT/US2015/051975 filed Sep. 24, 2015, 9 pages.
International Searching Authority, International Preliminary Report on Patentability dated Apr. 6, 2017, issued in connection with International Application No. PCT/US2015/051983 filed Sep. 24, 2015, 7 pages.
International Searching Authority, International Preliminary Report on Patentability dated Apr. 6, 2017, issued in connection with International Application No. PCT/US2015/051993 filed Sep. 24, 2015, 8 pages.
International Searching Authority, International Preliminary Report on Patentability dated Feb. 23, 2017, issued in connection with International Application No. PCT/US2015/044218, filed Aug. 7, 2015, 10 pages.
Non-Final Office Action dated Jul. 10, 2017, issued in connection with U.S. Appl. No. 14/297,193, filed Jun. 5, 2014, 33 pages.
Notice of Allowance dated Apr. 6, 2017, issued in connection with U.S. Appl. No. 14/197,403, filed Mar. 5, 2014, 5 pages.
Notice of Allowance dated Sep. 19, 2017, issued in connection with U.S. Appl. No. 14/455,651, filed Aug. 8, 2014, 12 pages.
Notice of Allowance dated Aug. 24, 2017, issued in connection with U.S. Appl. No. 14/495,590, filed Sep. 24, 2014, 10 pages.
Notice of Allowance dated May 31, 2017, issued in connection with U.S. Appl. No. 14/495,684, filed Sep. 24, 2014, 5 pages.
Notice of Allowance dated May 4, 2017, issued in connection with U.S. Appl. No. 14/495,595, filed Sep. 24, 2014, 5 pages.

\* cited by examiner

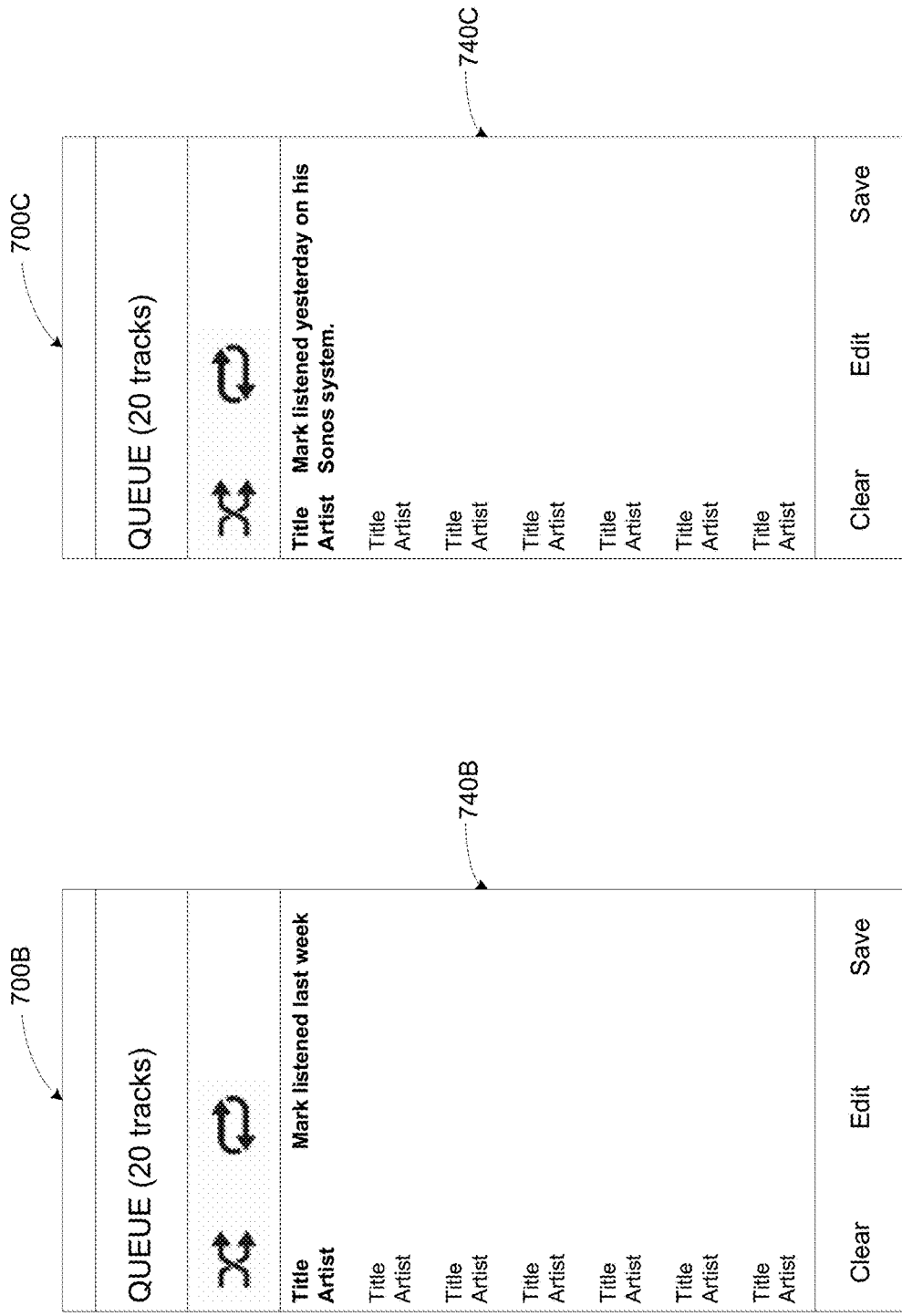

MEDIA ITEM CONTEXT FROM SOCIAL MEDIA

CROSS REFERENCE TO RELATED APPLICATIONS

This application is related to the following applications filed on the same day as the present application, the contents of each are incorporated by reference herein: entitled "Social Media Queue", U.S. application Ser. No. 14/495,595 filed Sep. 24, 2014, entitled "Playback Updates," U.S. application Ser. No. 14/495,633 filed Sep. 24, 2014; entitled "Indicating an Association Between a Social Media Account and a Media Playback System," U.S. application Ser. No. 14/495,706 filed Sep. 24, 2014; entitled "Associating a Captured Image with a Media Item," U.S. application Ser. No. 14/495,590 filed Sep. 24, 2014; and entitled "Social Media Connection Recommendations Based On Playback Information," U.S. application Ser. No. 14/495,684 filed Sep. 24, 2014.

FIELD OF THE DISCLOSURE

The disclosure is related to consumer goods and, more particularly, to methods, systems, products, features, services, and other items directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 7B shows yet another example controller interface;

FIG. 7C shows a further example controller interface;

Figure 1:
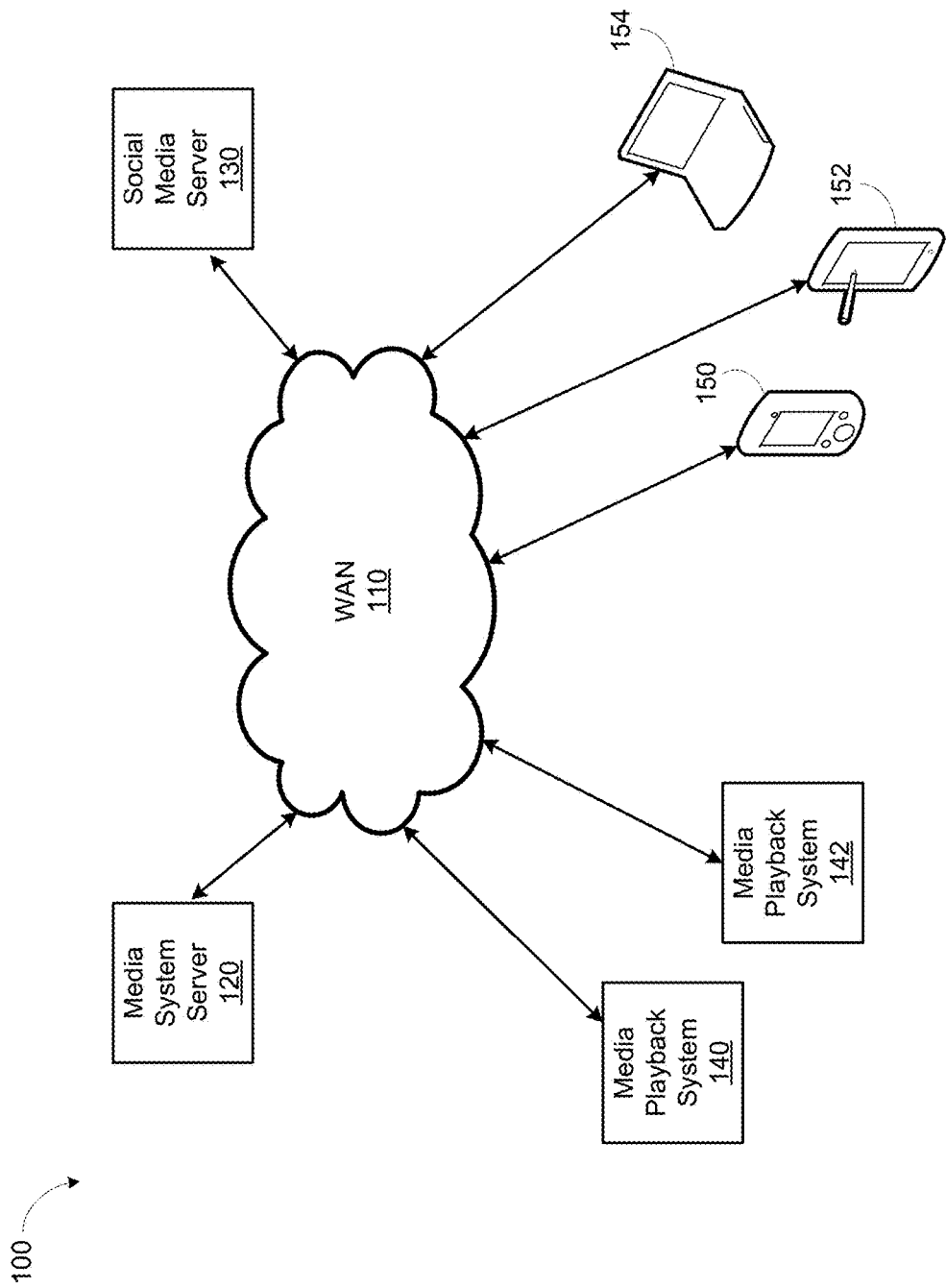
FIG. 1 shows an example network configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

A social component to music listening may enhance the experience of listening to a media playback system. For example, in some cases, listening to a media playback system as a group may enhance the listening experience, as members of the group may share a common appreciation for the music. In other cases, a social component to music listening may facilitate discovery of new artists, albums, or genres, as tastes in music may be shared. Many other benefits from a social component to music listening are possible as well.

A social media service may facilitate incorporating a social component to listening to a media playback system. In one example, after receiving an opt-in, the media playback system may provide the social media service with playback history data indicating media items that are currently playing at or have been played at the media playback system. Further, such playback history data could be associated with a particular account of the social media service, such as an account that is registered to the media playback system. Then, in aggregate, playback history data provided from multiple instances of the media playback system may provide the social media service with respective playback history data for a plurality of accounts.

The social media service may relate such playback history data to its social network, which may reveal relationships between accounts of the social media service. For instance, the related data may indicate that two or more accounts have listened to the same music. Further, provided that the listening data is updated regularly, the related data may indicate a temporal component—e.g., that the two or more accounts have listened to the same music within the past day or week or perhaps within the past hour. Or, further, historically, that two or more accounts listened to the same music within a certain time period (e.g., that two accounts listened to a particular artist during the summer of 2014).

Based on the combination of playback history data from the media playback systems and its social network, the social media service may provide contextual information relating to a particular media item that is currently playing on a media playback system that is registered to a particular account of the social media service. For instance, the social media service may provide a controller with indications of one or more accounts of the social media service that are connected to the particular account within the social network and have played the particular media item that the media playback system is currently playing. The controller may then display an indication of the one or more accounts of the social media service in association with an indication of the particular media item. For instance, the controller may display a "Now Playing" screen that indicates the particular media item, perhaps by way of a display of one or more of the media item title, the media item's artist or author, or the album on which the media item was released. In another example, the social media service may display such contextual information in a post to its social network.

In further examples, the social media service may influence media items that are played back at a media playback system. For instance, similar music tastes among connections may be used in an algorithm to determine media items to stream to the media playback system. Many examples are possible.

As indicated above, examples provided herein are directed to providing contextual information from a social network around a media item. In one aspect, a method is provided. The method may involve receiving an indication of a particular media item that is currently playing on a media playback system. The method may also involve querying a social media service for one or more accounts of the social media service that (i) are connected within a social network to a particular account of the social media service that is registered to the media playback system and (ii) have received respective indications of the particular media item from respective media playback systems within a particular period of time. The method may further involve receiving data indicating the queried one or more accounts of the social media service that (i) are connected within the social network to the particular account of the social media service that is registered to the media playback system and (ii) have received respective indications of the particular media item from respective media playback systems within a particular period of time. The method may involve causing one or more respective indications of the received one or more accounts of the social media service to be displayed on a graphical interface in association with an indication of the particular media item.

In another aspect, a computing device is provided. The computing device includes a network interface, at least one processor, a data storage, and a program logic stored in the data storage and executable by the at least one processor to perform operations. The operations may include receiving an indication of a particular media item that is currently playing on a media playback system. The operations may also include querying a social media service for one or more accounts of the social media service that (i) are connected within a social network to a particular account of the social media service that is registered to the media playback system and (ii) have received respective indications of the particular media item from respective media playback systems within a particular period of time. The operations may further include receiving data indicating the queried one or more accounts of the social media service that (i) are connected within the social network to the particular account of the social media service that is registered to the media playback system and (ii) have received respective indications of the particular media item from respective media playback systems within a particular period of time. The operations may include causing one or more respective indications of the received one or more accounts of the social media service to be displayed on a graphical interface in association with an indication of the particular media item.

In yet another aspect, a non-transitory computer-readable medium is provided. The non-transitory computer-readable medium having instructions stored thereon that are executable by a computing device of a media playback system to cause the computing device to perform operations. The operations may include receiving an indication of a particular media item that is currently playing on a media playback system. The operations may also include querying a social media service for one or more accounts of the social media service that (i) are connected within a social network to a particular account of the social media service that is registered to the media playback system and (ii) have received respective indications of the particular media item from respective media playback systems within a particular period of time. The operations may further include receiving data indicating the queried one or more accounts of the social media service that (i) are connected within the social network to the particular account of the social media service that is registered to the media playback system and (ii) have received respective indications of the particular media item from respective media playback systems within a particular period of time. The operations may include causing one or more respective indications of the received one or more accounts of the social media service to be displayed on a graphical interface in association with an indication of the particular media item.

In another aspect, another method is provided. The method may involve receiving indications of (i) a particular media item currently playing at a media playback system, and (ii) a particular account of a social media service that is registered with the media playback system. The method may also involve determining one or more accounts of the social media service that (i) are connected to the particular account within a social network, and (ii) have played the particular media item on respective media playback systems within a particular period of time. The method may further involve sending an indication of the determined one or more accounts to the media playback system.

In a further aspect, a computing system is provided. The computing system includes a network interface, at least one processor, a data storage, and a program logic stored in the data storage and executable by the at least one processor to perform operations. The operations may include receiving indications of (i) a particular media item currently playing at a media playback system, and (ii) a particular account of a social media service that is registered with the media playback system. The operations may also include determining one or more accounts of the social media service that (i) are connected to the particular account within a social network, and (ii) have played the particular media item on respective media playback systems within a particular period of time. The operations may further include sending an indication of the determined one or more accounts to the media playback system.

In yet another aspect, a non-transitory computer-readable medium is provided. The non-transitory computer-readable medium having instructions stored thereon that are executable by a computing system to cause the computing system to perform operations. The operations may include receiving indications of (i) a particular media item currently playing at a media playback system, and (ii) a particular account of a social media service that is registered with the media playback system. The operations may also include determining one or more accounts of the social media service that (i) are connected to the particular account within a social network, and (ii) have played the particular media item on respective media playback systems within a particular period of time. The operations may further include sending an indication of the determined one or more accounts to the media playback system.

It will be understood by one of ordinary skill in the art that this disclosure includes numerous other embodiments.

II. Example Network Configuration

FIG. 1 shows an example network configuration 100 in which one or more embodiments disclosed herein may be practiced or implemented. As shown, the network configuration 100 includes a wide area network ("WAN") 110 that communicatively couples a media system server 120, a social-media server 130, one or more media playback systems 140 and 142, and one or more computing devices 150, 152, and 154. It should be understood that the network configuration 100 may include more or fewer of the depicted network elements and/or may include various other network elements not shown in FIG. 1 (e.g. one or more media sources).

In examples, the WAN 110 may include the Internet and/or one or more cellular networks, among other networks. Although the WAN 110 is shown as one network, it should be understood that the WAN 110 may include multiple, distinct WANs that are themselves communicatively linked. The WAN 110 may facilitate transferring data between one or more of the various network elements shown in FIG. 1. In some examples, a given network element may communicate with another network element through yet another network element. For instance, the media playback systems 140 and 142 may communicate with the social-media server 130 through the media system server 120 and/or the computing devices 150-154 may communicate with the media system server 120 through the social-media server 130. Other examples are also possible.

In some examples, certain network elements may be communicatively coupled to other network elements via elements other than the WAN 110. In particular, certain network elements may be communicatively coupled via a local area network (e.g., via WiFi), a personal area network (e.g., via Bluetooth), and/or other connections (e.g., via a wired connection). For example, the computing device 150 may communicate with the media playback system 140 via a local area network (e.g., WiFi or perhaps according to a proprietary protocol). The computing device 150 may do so while operating as part of the media playback system 140 (e.g., as a control device of the media playback system 140).

The media system server 120 may include a network interface, a processing unit, and data storage, all of which may be communicatively linked together by a system bus, network, or other connection mechanism. The network interface may facilitate data flow over the WAN 110 between the media system server 120 and other network elements. The processing unit may include one or more general purpose processors and/or one or more special purpose processors and may be integrated in whole or in part with the network interface. The data storage may include a non-transitory computer-readable medium, such as optical, magnetic, or flash memory, and may be integrated in whole or in part with the processing unit. The data storage may also include program instructions that are executable by the processing unit to carry out various operations described herein.

Moreover, the media system server 120 may be configured to store and/or access various data related to media items and/or media playback systems. In examples, the media system server 120 may be configured to store and/or access media items that are playable by a media playback system. In such examples, the media system server 120 may be configured to provide to a given media playback system media items (e.g., audio, video, and/or audio-visual files) or links, pointers, or other network location identifiers that are operable to locate the media items. Additionally, the media system server 120 may be configured to store and/or access a cross-service linking database that facilitates identifying a media item from a first media source based on media item information from a second media source.

The media system server 120 may also be configured to provide one or more media applications to the media playback systems 140-142 and/or the computing devices 150-154. In some cases, a media application may be operable to allow a computing device to control one or more media playback systems. Additionally or alternatively, a media application may be operable to allow a media playback system to interface with the social-media server 130 and playback media items based on social-media data. Further still, a media application may be operable to provide functions similar to those provided by a social-media application, discussed in further detail below. Other example media applications are also possible.

In examples, the media system server 120 may be configured to store and/or access account information corresponding to a particular media playback system. Such information, which may be collectively referred herein as a "playback system account", may include system information (e.g., a household identifier (HHID) that is used to uniquely identify the particular media playback system, identifiers of the devices within the particular system, the software version currently installed on the particular media playback system, etc.) user information (e.g., name, date of birth, etc. of the user or users of the particular system), playback history information (e.g., media items previously played on the particular system and perhaps timestamps indicating when such media items were played), playback preference information (e.g., frequency at which a given media item is played, indications of media items that have been "liked," "favorited" or "starred", etc.), and linked-account information (e.g., one or more social-media accounts that are linked to the particular media playback system). Other examples of information storable and accessible by the media system server 120 are also possible.

In some examples, a playback system account may also include information regarding the media services that provide media to the particular media playback system. For example, the playback system account may include one or more identifiers of media services that provide media to the particular media playback system. Such information may be used by the media system server 120, or perhaps the social media server 130, to recommend media services that a user might be interested in. Other examples are also possible.

In practice, the media system server 120 may store some or all of the above-discussed information based on data received from media playback systems (e.g., the media playback systems 140 and 142), the social-media server 130, and/or the computing devices 150-154. In examples, such information may be provided to the media system server 120 when a media playback system is first setup, when a media playback system plays back media items, when a media playback system receives data indicating user feedback, and/or when a computing device runs a media application to control a media playback system, among other scenarios. In any event, the media system server 120 may be configured to provide an option to a user to "opt-in" so that the aforementioned information is collected by the media system server 120.

The media system server 120 may be further configured to use the above-discussed information to determine playback behaviors of users of media playback systems, among other operations. Based on user playback behaviors, the media system server 120 may perform a number of operations that may add to the users' playback experience. For example, such information may be used to identify a trending artist and then recommend that trending artist to a user whose playback history indicates he/she listens to other artists similar to the trending artist. Other examples are certainly possible.

The social-media server 130 may include a network interface, a processing unit, and data storage, similar to those of the media system server 120 discussed above. The social-media server 130 may be configured to provide a social-media service to subscribers to the service. For example, the social-media server 130 may be configured to establish and/or maintain a social network. To this end, the social-media server 130 may be configured to host a social-media webpage accessible over the WAN 110 by subscribers utilizing any suitable computing device, such as the computing devices 150-154.

In examples, the social-media server 130 may be configured to store subscriber account information, which may be collectively referred herein as a "social media account". Such information may include the name, gender, birthdate, email address, and/or residential address, among other information, for each subscriber. Moreover, the social-media server 130 may also be configured to link a given subscriber with a particular media playback system. For example, when a user first subscribes to the social-media service, the user may provide information, such as a HHID, of a media playback system used by the user, and the social-media server 130 may then store such information in the account of the subscriber.

In addition to subscriber account information, the social-media server 130 may also be configured to store respective subscriber profiles for each subscriber. Broadly speaking, a subscriber profile may include information regarding a subscriber's life, such as relationship status, photos, videos, career information, education information, hobbies/interests, locations visited (e.g., "check-in" locations), sports teams that the subscriber is a fan of, and/or movies, books, artists, TV shows, and the like that the subscriber previously experienced and perhaps enjoyed. Such information may be presented on a subscriber profile in a number of manners, such as through subscriber posts, status updates, blogs, and other uploads.

The social network provided by the social-media server 130 may be configured so that subscribers may readily share and exchange information, ideas, creations, and the like within a virtual community. The social-media service may provide to its subscribers, via a social-media webpage, respective social-media information that is determined to be relevant to a particular subscriber. Such information may be provided in several manners (e.g., as a "news feed", "timeline", or the like) and may be personalized to fit the preferences of a particular subscriber. In examples, this information may be repeatedly updated to reflect current information that may be relevant to a particular subscriber.

A given subscriber may have certain "friends" that he/she chooses to associate with. After someone is deemed a "friend" with a given subscriber, the given subscriber may then receive social information that is uploaded, tagged, posted, or otherwise provided by the "friend." For example, the given subscriber's news feed may show a photograph that a "friend" captured and subsequently posted to the social-media webpage. Moreover, a listing of a given subscriber's "friends" may also be provided and that listing may include various information in various forms reflecting a current "status" or the like for a given "friend." The given subscriber may at also be able to "de-friend" someone that was previously deemed a "friend."

In practice, the social-media server 130 may be configured to collect and analyze the information that is shared and exchanged over the social-media service. The social-media server 130 may be configured to use this collected information, as well as subscriber account information, to determine for a particular subscriber other subscribers that the particular subscriber might want to become "friends" with. In this way, the social-media server 130 may be configured to determine the preferences and/or tastes of its subscribers and recommend other subscribers with similar tastes.

Moreover, the social-media server 130 may be configured to provide one or more social-media applications that are operable to provide subscribers access to the social-media service in a manner different than through a web browser. Such an application may be installed on a computing device that is perhaps portable. In examples, a social-media application may further be operable to provide functions similar to those provided by a media application, as discussed above.

Furthermore, a social-media application, and/or perhaps a media application, installed on a computing device may be operable to determine what, if any, other applications are also installed on the computing device. An application that is operable in such a manner may facilitate linking a playback system account with a social media account and vice versa. In examples, after a social-media application installed on a computing device is linked to a playback system account, the social-media application may be operable to affect playback of media at a media playback system identified by the playback system account.

In examples, the network configuration 100 may also include one or more media service provider servers communicatively coupled to the WAN 110. In general, a given media service provider server may correspond to a media service provider that provides streaming media, such as Internet radio and/or "on-demand" media, to the media playback systems 140-142 and/or the computing devices 150-154. A user may subscribe to such a service and register media devices (e.g., a media playback system and/or one or more computing devices) that may at times be used to access the media service. A media service provider server may include similar components as the servers discussed above.

Generally speaking, the media playback systems 140 and 142 may be any type of media playback system configured to receive and transmit data over a communication network and playback media items. In practice, each media playback system 140 and 142 may include one or more playback devices, as well as additional system devices (e.g., a controller device). An example media playback system is discussed in further detail below with reference to FIG. 2. It should be understood that the media playback system 140 and the media playback system 142 may be configured similarly or differently and/or may include similar or different devices.

In general, each computing device 150-154 may be any computing device configured to transfer data over a communication network. The computing devices 150-154 may each include at least one processor, memory, a graphical display, an input interface, and a network interface, among other components. In some instances, the graphical display and the input interface may be part of the same component (e.g., a touchscreen). The network interface may facilitate data flow between the computing device and another network element, for example, via the WAN 110. In some examples, one or more of the computing devices 150-154 may also include a camera configured to capture image and/or video data. Example computing devices include, but are not limited to, cellular phones, smartphones, PDAs, tablets, laptops, desktop computers, video game consoles, and smart TVs.

Moreover, the computing devices 150-154 may be configured to download, install, and operate an application, such as a media or social-media application. In examples, a given computing device may include a media application provided by the media system server 120 and a social-media application provided by the social media server 130, while another computing device may include one or the other application but not both.

A computing device may be configured to run both applications at the same time or individually. In some examples, the computing devices 150-154 may provide to the media system server 120 and/or the social media server 130 an indication of applications that are installed on a particular computing device. For instance, the computing device 150 may be configured to provide to the media system server 120 an indication that a social-media application is installed. Additionally or alternatively, the computing device 150 may be configured to provide to the social-media server 130 an indication that a media application is installed and/or active or otherwise currently running.

Furthermore, a computing device may be configured to provide social media information and/or media playback information to the media system server 120 and/or the social media server 130. Such information may then be used by the media system server 120 and/or the social media server 130 to help perform some of the operations disclosed in further detail below.

III. Example Media Playback System

Figure 2:
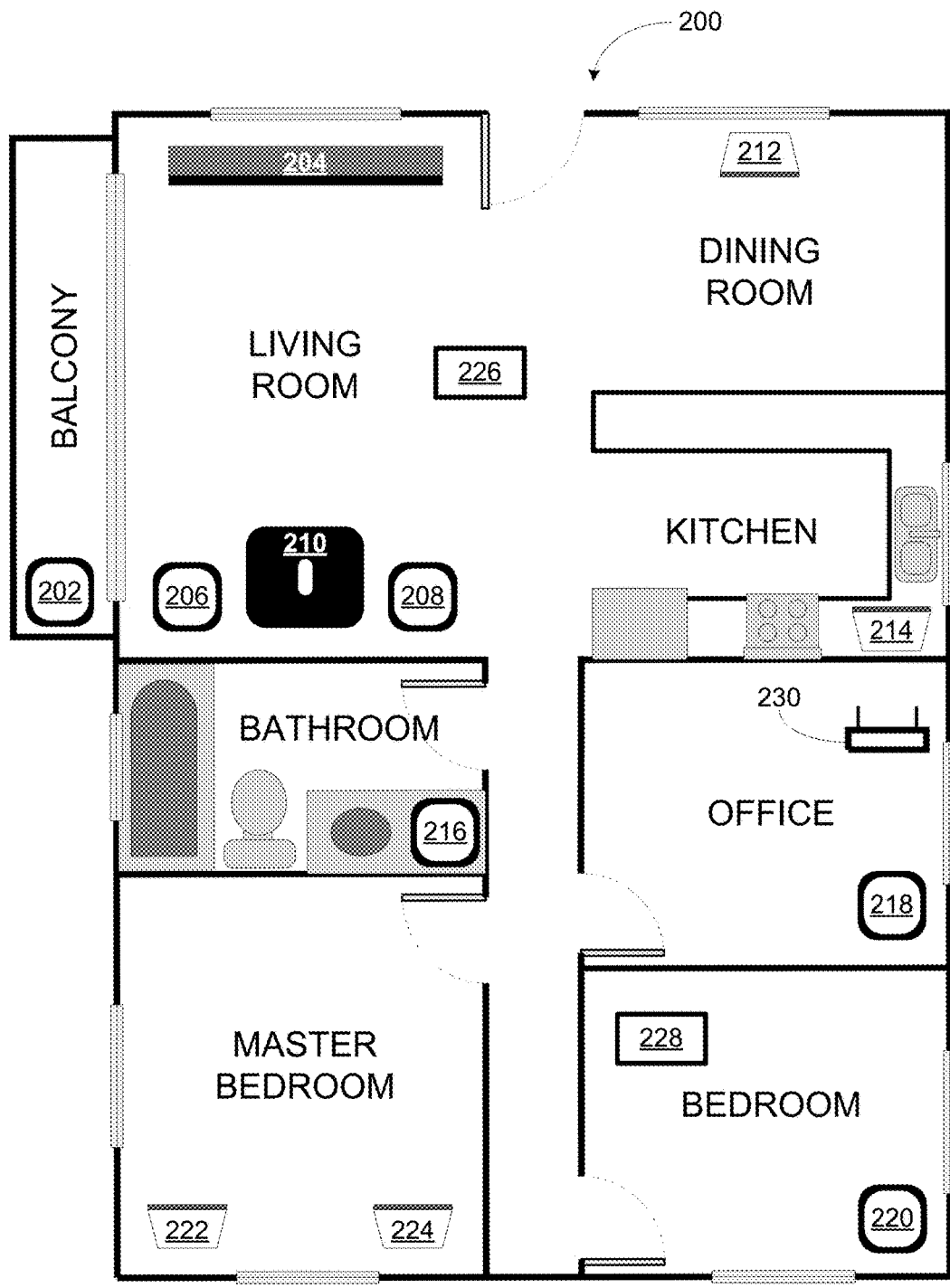
FIG. 2 shows an example media playback system configuration.

FIG. 2 shows an example configuration of a media playback system 200. The media playback system 200 as shown is associated with an example home environment having several rooms and spaces, such as for example, a master bedroom, an office, a dining room, and a living room. As shown in the example of FIG. 2, the media playback system 200 includes playback devices 202-224, control devices 226 and 228, and a wired or wireless network router 230.

Further discussions relating to the different components of the example media playback system 200 and how the different components may interact to provide a user with a media experience may be found in the following sections. While discussions herein may generally refer to the example media playback system 200, technologies described herein are not limited to applications within, among other things, the home environment as shown in FIG. 2. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 3:
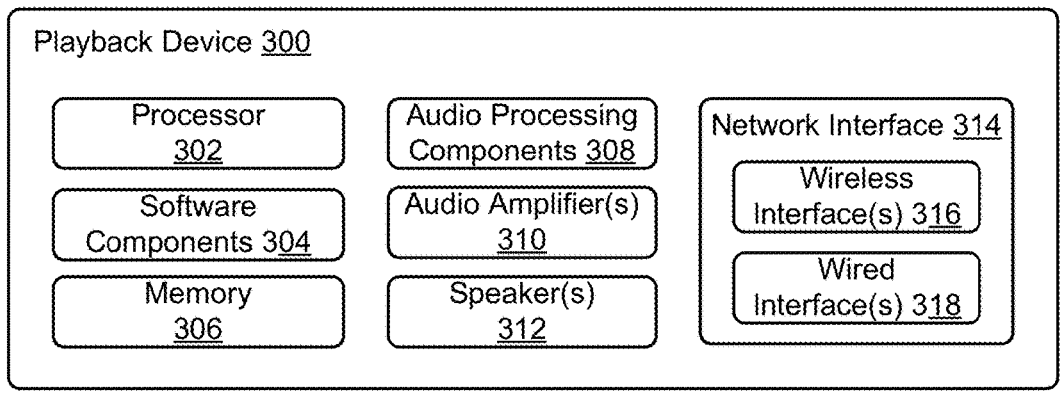
FIG. 3 shows a functional block diagram of an example playback device.

FIG. 3 shows a functional block diagram of an example playback device 300 that may be configured to be one or more of the playback devices 202-224 of the media playback system 200 of FIG. 2. The playback device 300 may include a processor 302, software components 304, memory 306, audio processing components 308, audio amplifier(s) 310, speaker(s) 312, and a network interface 314 including wireless interface(s) 316 and wired interface(s) 318. In one case, the playback device 300 may not include the speaker(s) 312, but rather a speaker interface for connecting the playback device 300 to external speakers. In another case, the playback device 300 may include neither the speaker(s) 312 nor the audio amplifier(s) 310, but rather an audio interface for connecting the playback device 300 to an external audio amplifier or audio-visual receiver.

In one example, the processor 302 may be a clock-driven computing component configured to process input data according to instructions stored in the memory 306. The memory 306 may be a tangible computer-readable medium configured to store instructions executable by the processor 302. For instance, the memory 306 may be data storage that can be loaded with one or more of the software components 304 executable by the processor 302 to achieve certain functions. In one example, the functions may involve the playback device 300 retrieving audio data from an audio source or another playback device. In another example, the functions may involve the playback device 300 sending audio data to another device or playback device on a network. In yet another example, the functions may involve pairing of the playback device 300 with one or more playback devices to create a multi-channel audio environment.

Certain functions may involve the playback device 300 synchronizing playback of audio content with one or more other playback devices. During synchronous playback, a listener will preferably not be able to perceive time-delay differences between playback of the audio content by the playback device 300 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 306 may further be configured to store data associated with the playback device 300, such as one or more zones and/or zone groups the playback device 300 is a part of, audio sources accessible by the playback device 300, or a playback queue that the playback device 300 (or some other playback device) may be associated with. The data may be stored as one or more state variables that are periodically updated and used to describe the state of the playback device 300. The memory 306 may also include the data associated with the state of the other devices of the media system, and shared from time to time among the devices so that one or more of the devices have the most recent data associated with the system. Other embodiments are also possible.

The audio processing components 308 may include one or more digital-to-analog converters (DAC), an audio preprocessing component, an audio enhancement component or a digital signal processor (DSP), and so on. In one embodiment, one or more of the audio processing components 308 may be a subcomponent of the processor 302. In one example, audio content may be processed and/or intentionally altered by the audio processing components 308 to produce audio signals. The produced audio signals may then be provided to the audio amplifier(s) 310 for amplification and playback through speaker(s) 312. Particularly, the audio amplifier(s) 310 may include devices configured to amplify audio signals to a level for driving one or more of the speakers 312. The speaker(s) 312 may include an individual transducer (e.g., a "driver") or a complete speaker system involving an enclosure with one or more drivers. A particular driver of the speaker(s) 312 may include, for example, a subwoofer (e.g., for low frequencies), a mid-range driver (e.g., for middle frequencies), and/or a tweeter (e.g., for high frequencies). In some cases, each transducer in the one or more speakers 312 may be driven by an individual corresponding audio amplifier of the audio amplifier(s) 310. In addition to producing analog signals for playback by the playback device 300, the audio processing components 308 may be configured to process audio content to be sent to one or more other playback devices for playback.

Audio content to be processed and/or played back by the playback device 300 may be received from an external source, such as via an audio line-in input connection (e.g., an auto-detecting 3.5 mm audio line-in connection) or the network interface 314.

The network interface 314 may be configured to facilitate a data flow between the playback device 300 and one or more other devices on a data network. As such, the playback device 300 may be configured to receive audio content over the data network from one or more other playback devices in communication with the playback device 300, network devices within a local area network, or audio content sources over a wide area network such as the Internet. In one example, the audio content and other signals transmitted and received by the playback device 300 may be transmitted in the form of digital packet data containing an Internet Protocol (IP)-based source address and IP-based destination addresses. In such a case, the network interface 314 may be configured to parse the digital packet data such that the data destined for the playback device 300 is properly received and processed by the playback device 300.

As shown, the network interface 314 may include wireless interface(s) 316 and wired interface(s) 318. The wireless interface(s) 316 may provide network interface functions for the playback device 300 to wirelessly communicate with other devices (e.g., other playback device(s), speaker(s), receiver(s), network device(s), control device(s), controller device(s) within a data network the playback device 300 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 318 may provide network interface functions for the playback device 300 to communicate over a wired connection with other devices in accordance with a communication protocol (e.g., IEEE 802.3). While the network interface 314 shown in FIG. 3 includes both wireless interface(s) 316 and wired interface(s) 318, the network interface 314 may in some embodiments include only wireless interface(s) or only wired interface(s).

In one example, the playback device 300 and one other playback device may be paired to play two separate audio components of audio content. For instance, playback device 300 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 300 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 300 is a playback device designed to render low frequency range audio content (i.e. a subwoofer), the playback device 300 may be consolidated with a playback device designed to render full frequency range audio content. In such a case, the full frequency range playback device, when consolidated with the low frequency playback device 300, may be configured to render only the mid and high frequency components of audio content, while the low frequency range playback device 300 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 3 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 200 of FIG. 2, the environment may have one or more playback zones, each with one or more playback devices. The media playback system 200 may be established with one or more playback zones, after which one or more zones may be added, or removed to arrive at the example configuration shown in FIG. 2. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 2, the balcony, dining room, kitchen, bathroom, office, and bedroom zones each have one playback device, while the living room and master bedroom zones each have multiple playback devices. In the living room zone, playback devices 204, 206, 208, and 210 may be configured to play audio content in synchrony as individual playback devices, as one or more bonded playback devices, as one or more consolidated playback devices, or any combination thereof. Similarly, in the case of the master bedroom, playback devices 222 and 224 may be configured to play audio content in synchrony as individual playback devices, as a bonded playback device, or as a consolidated playback device.

In one example, one or more playback zones in the environment of FIG. 2 may each be playing different audio content. For instance, the user may be grilling in the balcony zone and listening to hip hop music being played by the playback device 202 while another user may be preparing food in the kitchen zone and listening to classical music being played by the playback device 214. In another example, a playback zone may play the same audio content in synchrony with another playback zone. For instance, the user may be in the office zone where the playback device 218 is playing the same rock music that is being playing by playback device 202 in the balcony zone. In such a case, playback devices 202 and 218 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 200 may be dynamically modified, and in some embodiments, the media playback system 100 supports numerous configurations. For instance, if a user physically moves one or more playback devices to or from a zone, the media playback system 200 may be reconfigured to accommodate the change(s). For instance, if the user physically moves the playback device 202 from the balcony zone to the office zone, the office zone may now include both the playback device 218 and the playback device 202. The playback device 202 may be paired or grouped with the office zone and/or renamed if so desired via a control device such as the control devices 226 and 228. On the other hand, if the one or more playback devices are moved to a particular area in the home environment that is not already a playback zone, a new playback zone may be created for the particular area.

Further, different playback zones of the media playback system 200 may be dynamically combined into zone groups or split up into individual playback zones. For instance, the dining room zone and the kitchen zone 214 may be combined into a zone group for a dinner party such that playback devices 212 and 214 may render audio content in synchrony. On the other hand, the living room zone may be split into a television zone including playback device 204, and a listening zone including playback devices 206, 208, and 210, if the user wishes to listen to music in the living room space while another user wishes to watch television.

c. Example Control Devices

Figure 4:
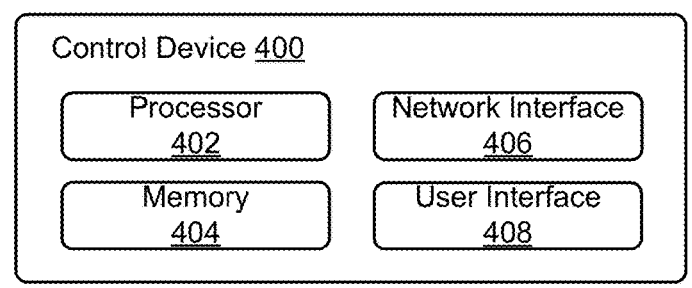
FIG. 4 shows a functional block diagram of an example control device.

FIG. 4 shows a functional block diagram of an example control device 400 that may be configured to be one or both of the control devices 226 and 228 of the media playback system 200. As shown, the control device 400 may include a processor 402, memory 404, a network interface 406, and a user interface 408. In one example, the control device 400 may be a dedicated controller for the media playback system 200.

In another example, the control device 400 may be a network device on which media application software is installed, such as an iPhone™, iPad™ or any other smart phone, tablet or network device (e.g., a networked computer such as a PC or Mac™). In examples, the media application may take the form of a media playback system controller application operable to control a media playback system. In yet another example, the media application may be operable to cause the control device 400 to obtain media (e.g., from a given media service provider associated with the media application) independent from a media playback system and may also be operable as a control device of a media playback system.

The processor 402 may be configured to perform functions relevant to facilitating user access, control, and configuration of the media playback system 200. The memory 404 may be configured to store instructions executable by the processor 402 to perform those functions. The memory 404 may also be configured to store the media playback system controller application software and other data associated with the media playback system 200 and the user.

In one example, the network interface 406 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 406 may provide a means for the control device 400 to communicate with other devices in the media playback system 200. In one example, data and information (e.g., such as a state variable) may be communicated between control device 400 and other devices via the network interface 406. For instance, playback zone and zone group configurations in the media playback system 200 may be received by the control device 400 from a playback device or another network device, or transmitted by the control device 400 to another playback device or network device via the network interface 406. In some cases, the other network device may be another control device.

Playback device control commands such as volume control and audio playback control may also be communicated from the control device 400 to a playback device via the network interface 406. As suggested above, changes to configurations of the media playback system 200 may also be performed by a user using the control device 400. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 400 may sometimes be referred to as a controller, whether the control device 400 is a dedicated controller or a network device on which media playback system controller application software is installed.

Figure 5:
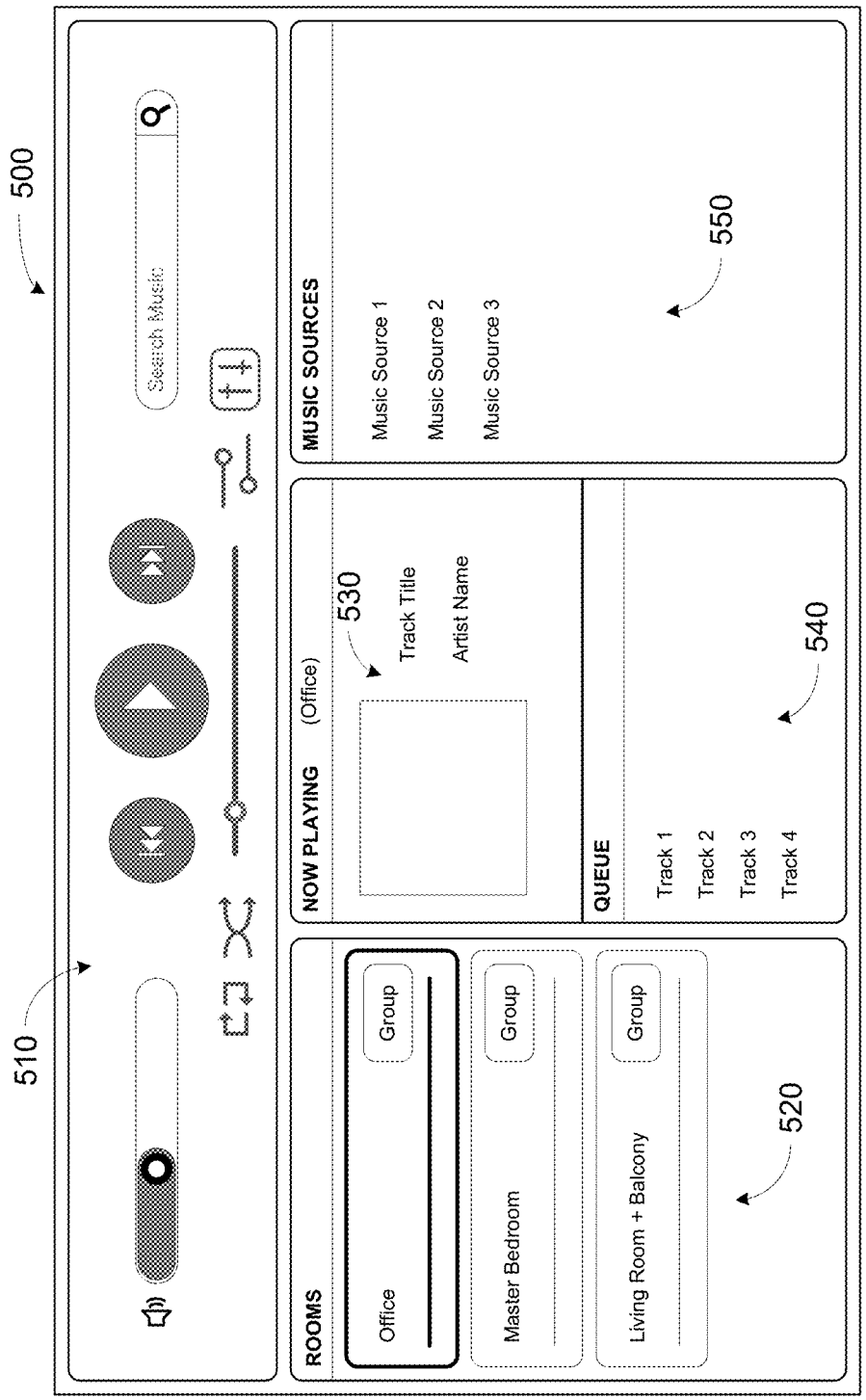
FIG. 5 shows an example controller interface.

The user interface 408 of the control device 400 may be configured to facilitate user access and control of the media playback system 200, by providing a controller interface such as the controller interface 500 shown in FIG. 5. The controller interface 500 includes a playback control region 510, a playback zone region 520, a playback status region 530, a playback queue region 540, and an audio content sources region 550. The user interface 500 as shown is just one example of a user interface that may be provided on a network device such as the control device 400 of FIG. 4 (and/or the control devices 226 and 228 of FIG. 2) and accessed by users to control a media playback system such as the media playback system 200. Other user interfaces of varying formats, styles, and interactive sequences may alternatively be implemented on one or more network devices to provide comparable control access to a media playback system.

The playback control region 510 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 510 may also include selectable icons to modify equalization settings, and playback volume, among other possibilities.

The playback zone region 520 may include representations of playback zones within the media playback system 200. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone.

Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 500 are also possible. The representations of playback zones in the playback zone region 520 may be dynamically updated as playback zone or zone group configurations are modified.

The playback status region 530 may include graphical representations of audio content that is presently being played, previously played, or scheduled to play next in the selected playback zone or zone group. The selected playback zone or zone group may be visually distinguished on the user interface, such as within the playback zone region 520 and/or the playback status region 530. The graphical representations may include track title, artist name, album name, album year, track length, and other relevant information that may be useful for the user to know when controlling the media playback system via the user interface 500.

The playback queue region 540 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 500 of FIG. 5, the graphical representations of audio content in the playback queue region 540 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 550 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 200 of FIG. 2, local music libraries on one or more network devices (such as a control device, a network-enabled personal computer, or a networked-attached storage (NAS), for example), streaming audio services providing audio content via the Internet (e.g., the media service servers 135-145), or audio sources connected to the media playback system via a line-in input connection on a playback device or network devise, among other possibilities.

In some embodiments, audio content sources may be regularly added or removed from a media playback system such as the media playback system 200 of FIG. 2. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

IV. Example Method to Provide Social Network Context for Media Item

As discussed above, in some examples, a computing device may provide a social networking context for a media item.

Figure 6:
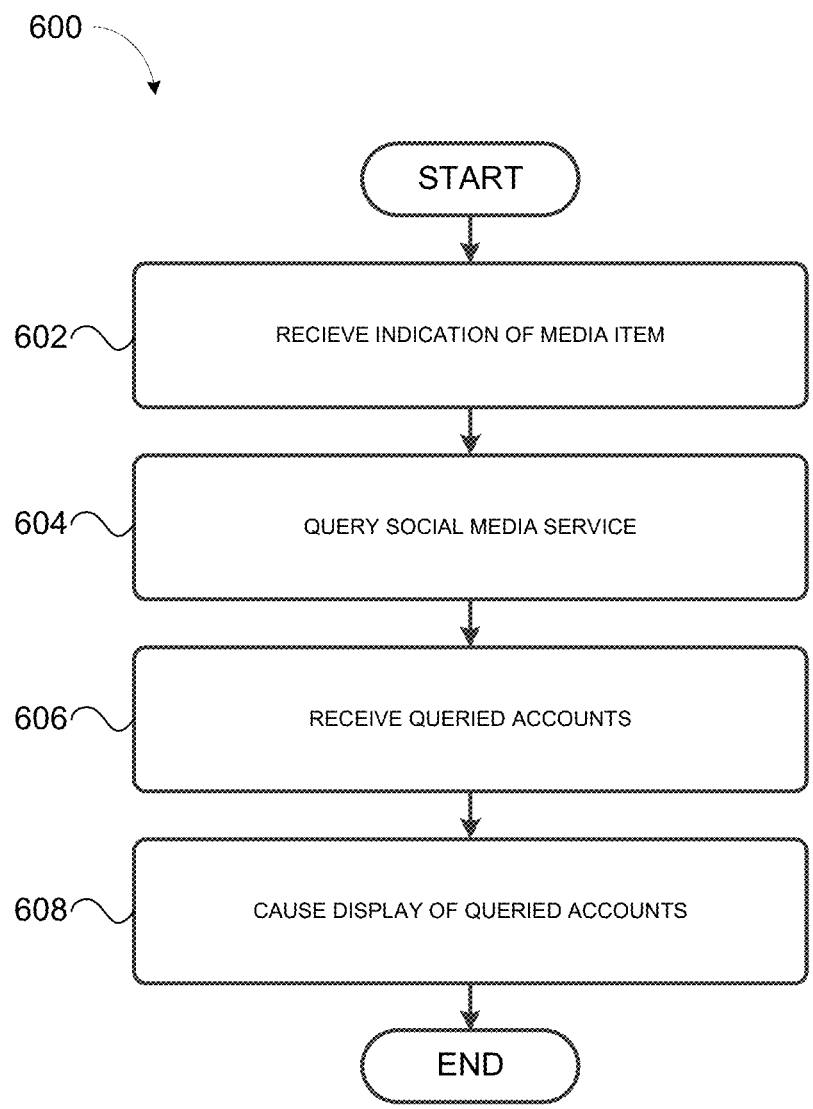
FIG. 6 shows a flow diagram of an example method.

For method 600 of FIG. 6, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the method 600, and other processes and methods disclosed herein, each block in FIG. 6 may represent circuitry that is wired to perform the specific logical functions in the process.

Furthermore, although the blocks are illustrated in sequential order, these blocks may also be performed in parallel, and/or in a different order than those described herein. Also, the various blocks may be combined into fewer blocks, divided into additional blocks, and/or removed based upon the desired implementation.

For clarity, the methods may be described herein with reference to FIGS. 1 and 7A-7D. It should be understood, however, that this is for purposes of example and explanation only and that the operations of the methods should not be limited by these figures.

a. Receiving an Indication of a Particular Media Item.

At block 602, the method may involve receiving an indication of a particular media item. In some examples, a computing device, such as control device 150 of FIG. 1 (which may be an instance of control device 400 of FIG. 4), may receive an indication of a particular media item that is currently playing on a media playback system, such as media playback system 140 of FIG. 1. Playback of the particular media item may involve one or more playback devices of the media playback system playing the media item. The indication of the media item may be an identifier, such as a URI, that distinguishes the media item from other available media items.

The computing device may receive the indication via a network interface, such as network interface 406. For example, control device 150 may receive the indication from media playback system 150. In some examples, the computing device may receive the indication from a playback device of the media playback system, which may maintain or have access to a playback queue of the media playback system.

In some examples, the computing device may request the indication of the particular media item from the media playback system (e.g., from a playback device of the media playback system). As noted above, one or more playback devices of the media playback system may maintain or have access to data representing a playback queue from which the media playback system plays media items. In some examples, the computing device may send, via its network interface, a request for data indicating media items that are queued for in a playback queue of the media playback system. In response, the computing device may receive data indicating the particular media item that is currently being played by the media playback system and perhaps one or more media items that are also in the playback queue. In various examples, the playback queue might include data maintained on a playback device, data maintained in the cloud (e.g., on a server involved in providing a cloud service), or a social-media queue.

In other examples, the computing device may receive the indication of the particular media item after connecting to the media playback system over a local area network. Such a connection may indicate proximity between the computing device and the media playback system. Accordingly, a computing device that has made such a connection to a media playback systems registered to a particular account may indicate that the particular account is playing the particular media item.

In some implementations, the computing device may initiate playback of a particular media item on the media playback system. The computing device may initiate playback by way of a transmission sent via a network interface. For instance, the computing device may send a command to start playback of the playback queue. In other instances, the computing device may send a message indicating one or more media items to add to the playback queue of the media playback system. Many examples of initiating playback are possible.

While individual media items have been discussed by way of example, in various examples, the computing device may alternatively receive an indication of any audio content source, such as a playlist (e.g., of a streaming audio service) or a streaming radio station, among other examples.

b. Querying Social Media Service.

At block 604, the method may involve querying a social media service. More particularly, a computing device may query the social media service for data related to the particular media item currently playing on the media playback system. Querying the social media service may involve a computing device, such as computing device 150, sending a query to a server, such as social-media server 130, which may in turn be one instance of multiple servers by which the social media service provides a social network.

As noted above, a social media service may provide a social network that includes various connections between subscriber accounts of the social media service. In some examples, a particular account of the social media service may be registered to the media playback system. Multiple instances of the media playback system may exist, and some of these other instances may be registered to other accounts of the social media service, respectively. As noted above, the registrations between media playback systems and accounts of the social media service may be referred to as linked-account information. Such information may be maintained by a server, such as social media server 130 or media system server 120, among other examples.

In some cases, the computing device may query the social media service for one or more accounts of the social media service that are connected within a social network to a particular account of the social media service that is registered to the media playback system. As noted above, a social network provided by a social media service may include various connections between accounts of the social media service. Such connections are sometimes referred to as "links", "connections," "circles", or "friends," among other examples. Also, as noted above, such connections may represent certain people that that a user represented by the particular account has chosen to associate with.

The computing device may further limit the query for the connected accounts for one or more accounts that have initiated playback of the particular media item on respective media playback systems. These accounts may represent connections of the particular account that have played back, on their respective media playback systems, the particular media item that is currently playing on the media playback system registered to the particular account. In other words, the queried accounts may represent one or more "friends" that are (i) connected within the social network to the particular account that is registered to the media playback system and (ii) have initiated playback of the particular media item on their respective media playback systems.

In other examples, the computing device may query the social media service for one or more accounts that have received respective indications of the particular media item from respective media playback systems. Receiving an indication of the particular media item may indicate that the particular media item has been played back on a media playback system registered to a certain account.

As noted above, the media playback system may provide the social media service with playback history data indicating media items that are currently playing at or have been played at the media playback system. In some cases, the media playback system may send the data to the social media service, which may then maintain a database or other data storage of the data. In other cases, the social media service may have access to a database or other data storage of the data. For instance, the social media service may have access to media system server 120.

In some cases, the query for the connected accounts for one or more accounts that have initiated playback of the particular media item on respective media playback systems may be further limited to one or more accounts that have initiated playback of the particular media item on respective media playback systems within a particular period of time, such as a day or a week. This may further limit the queried accounts to accounts that have played back the particular media item recently (i.e., within the particular period of time). In some cases, the particular period of time may be configured and indicated in a message to the social networking service. In the case noted above in which the query indicates media playback systems that have received an indication of the particular media item, the query may request one or more accounts of the social networking service that have received the indication of the particular media item within a particular period of time.

In some implementations, querying the social media service may involve requesting certain data from the social media service and providing certain information to define the request. For example, querying the social media service may involve the computing device sending, via the network interface to a social-media computing system (e.g., social media server 130) certain data. This sent data may include a track identification that uniquely identifies the particular media item among a plurality of media items of a media streaming service. The track identification may be any suitable identifier by which the social-media computing system can distinguish the particular media item from other media items. In some examples, the track identification may include a URI, as discussed above. The sent data may further include an indication of the media streaming service. Many media streaming services are currently offered, and some media items are available from more than one media streaming service. In some cases, the track identification may also identify the streaming media service in addition to the particular media item. The sent data may further include an indication of the particular account that is registered to the social media service. Such data may indicate to the social media service the subscriber account on which to base the query.

The request portion of the query may identify the data sought by the query. For instance, the computing device may request the one or more accounts of the social media service that (i) are connected within the social media service to the particular account of the social media service that is registered to the media playback system, and (ii) have initiated playback of the particular media item on respective media playback systems within a particular period of time. Alternatively, the computing device may request the one or more accounts of the social media service that (i) are connected within the social media service to the particular account of the social media service that is registered to the media playback system, and (ii) have received respective indications of the particular media item from respective media playback systems within a particular period of time.

c. Receiving Queried Accounts.

At block 606, the method may involve receiving the queried accounts. In some examples, a computing device may receive, via its network interface, data indicating the queried one or more accounts of the social networking service. For instance, computing device 150 may receive data indicating the queried one or more accounts from social media server 130.

The data may indicate the queried one or more accounts in a variety of ways. As noted above, the social media server may store subscriber account information such as the name, gender, birthdate, email address, and/or residential address, among other information, for each subscriber account. The social media server may send data indicating any of this subscriber account information, among other possibilities. For instance, the computing device may receive data that indicates respective names of the one or more accounts. Alternatively, the computing device may receive respective pictures designated within the accounts to represent the subscribers. In some cases, the computing device may receive data that indicates the one or more profiles in several ways, such as by a name and a photo.

d. Causing Display of Queried Accounts.

At block 608, the method may involve causing display of the queried accounts. In some examples, a computing device may cause one or more respective indications of the received one or more accounts of the social media service to be displayed on a graphical interface, such as user interface 408 of control device 400 in FIG. 4.

Figure 7A:
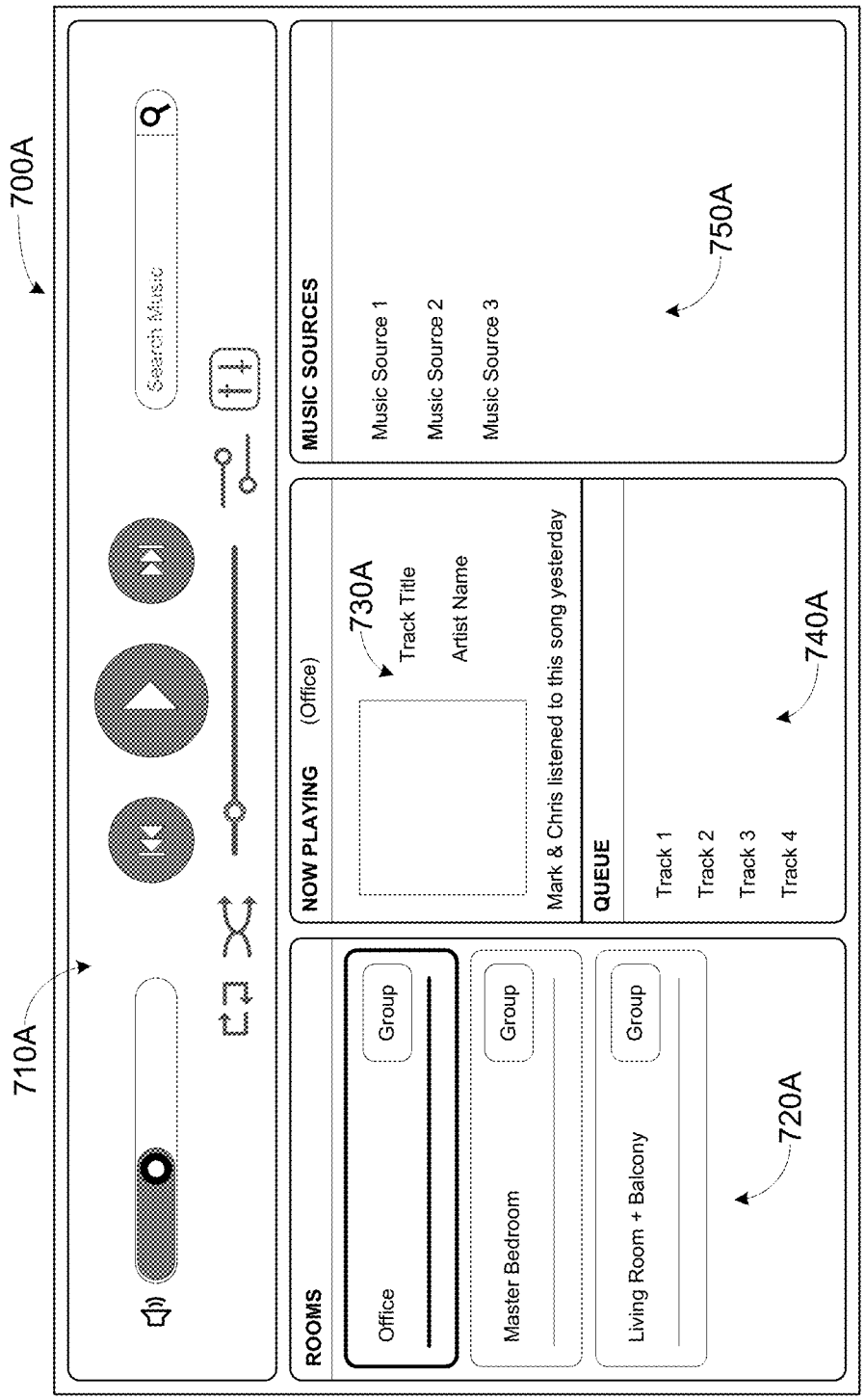
FIG. 7A shows another example controller interface.

In some examples, the computing device may cause the one or more respective indications of the received one or more accounts of the social media service to be displayed on the graphical interface in association with an indication of the particular media item. FIG. 7A shows controller interface 700A, which is an instance of controller interface 500. FIG. 7A includes a playback control region 710A, a playback zone region 720A, a playback status region 730A, a playback queue region 740A, and an audio content sources region 750A, which may be instances of playback control region 510, playback zone region 520, playback status region 530, playback queue region 540, and audio content sources region 550, respectively. The playback status region 730A indicates the particular media item by way of a track title, album name, and album artwork, as shown. The playback status region 730A also includes an indication that two accounts have listened to the media item ("Mark & Chris listened to this song yesterday").

As noted above, in some cases, a computing device may cause an indication of a playback queue of one or more media items to be displayed on the graphical interface. For instance, playback queue region 540 of FIG. 5 indicates a playback queue. As another example, FIG. 7B shows a controller interface 700B that includes a playback queue region 740B. Playback queue region 740B indicates the currently playing media item (i.e., the particular media item) in bold text. In some cases, the computing device may cause one or more respective indications of the received one or more accounts of the social media service to be displayed on the graphical interface in association with the indication of the particular media item within the displayed playback queue. As an example, playback queue region 740B includes an indication ("Mark listened to this song last week") in association with the indication of the particular media item within the displayed playback queue.

In some examples, a computing device may cause one or more respective indications of the respective media playback systems to be displayed on a graphical interface in association with an indication of the particular media item. FIG. 7C shows a controller interface 700C that includes a playback queue region 740C. Playback queue region 740C includes an indication of a received account of the social media service ("Mark") and an indication of the media playback system that is registered with the account ("Sons system").

In some examples, a computing device may cause one or more respective indications of respective audio content sources to be displayed on a graphical interface in association with an indication of the particular media item. For instance, the computing device may cause display of an indication of a streaming audio service (e.g., "Mark listened to this song yesterday on SPOTIFY®" or "PANDORA® also provided this track to Mark yesterday.")

Figure 7D:
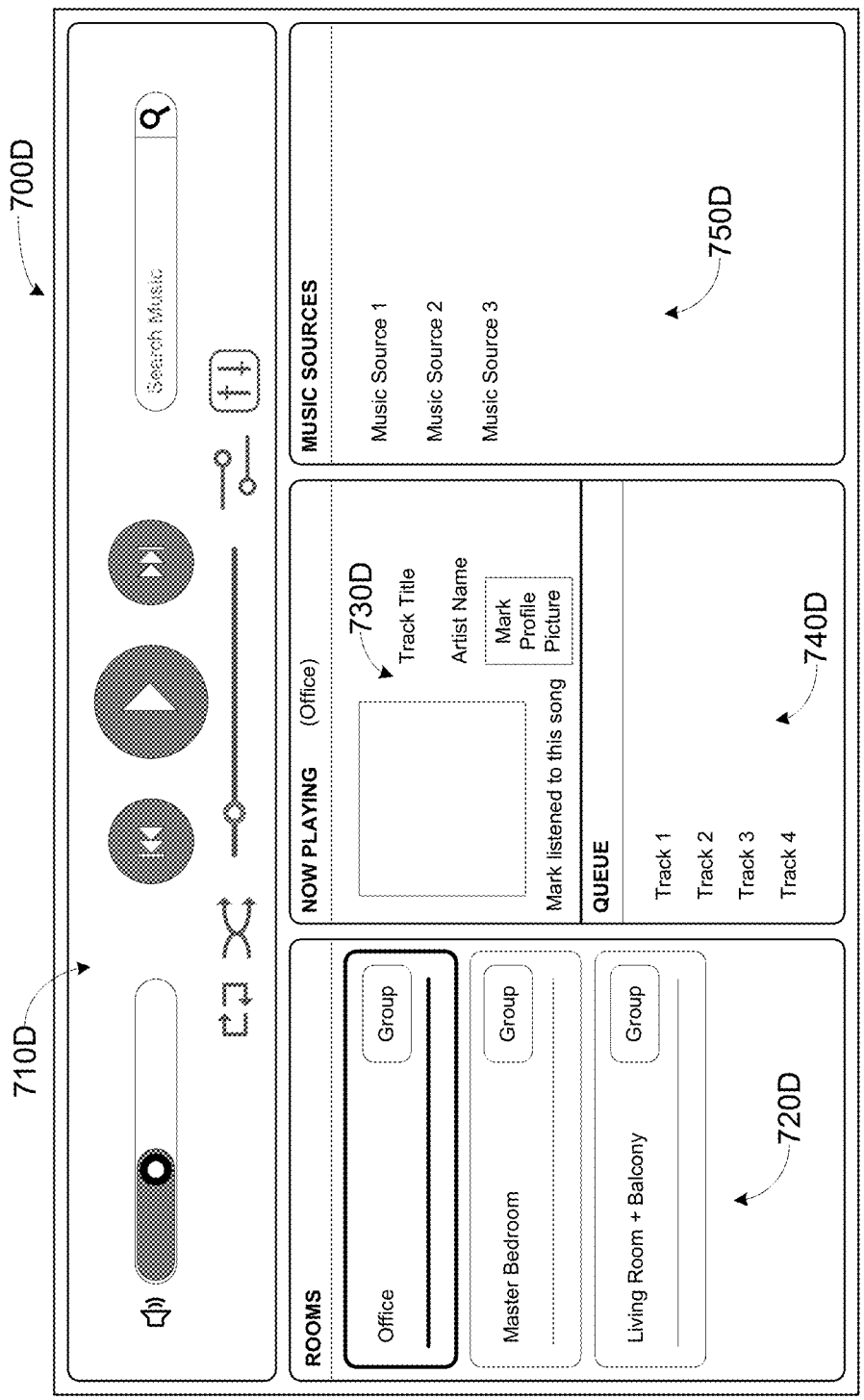
FIG. 7D shows another example controller interface.

Within examples, a computing device may cause one or more respective pictures associated with the received one or more accounts of the social media service to be displayed on the graphical interface in association with the indication of the particular media item. FIG. 7D shows controller interface 700D, which is an instance of controller interface 500. FIG. 7A includes a playback control region 710D, a playback zone region 720D, a playback status region 730D, a playback queue region 740D, and an audio content sources region 750D. As an example, playback status region 730D includes a profile picture associated with the received account (i.e., a profile picture related to the Mark's account). In some cases, the picture may be a reduced size version of the picture associated with the account, which may be referred to as a thumbnail.

V. Second Example Method to Provide Social Network Context for Media Item

As discussed above, in some examples, a computing device may provide a social networking context for a media item.

Figure 8:
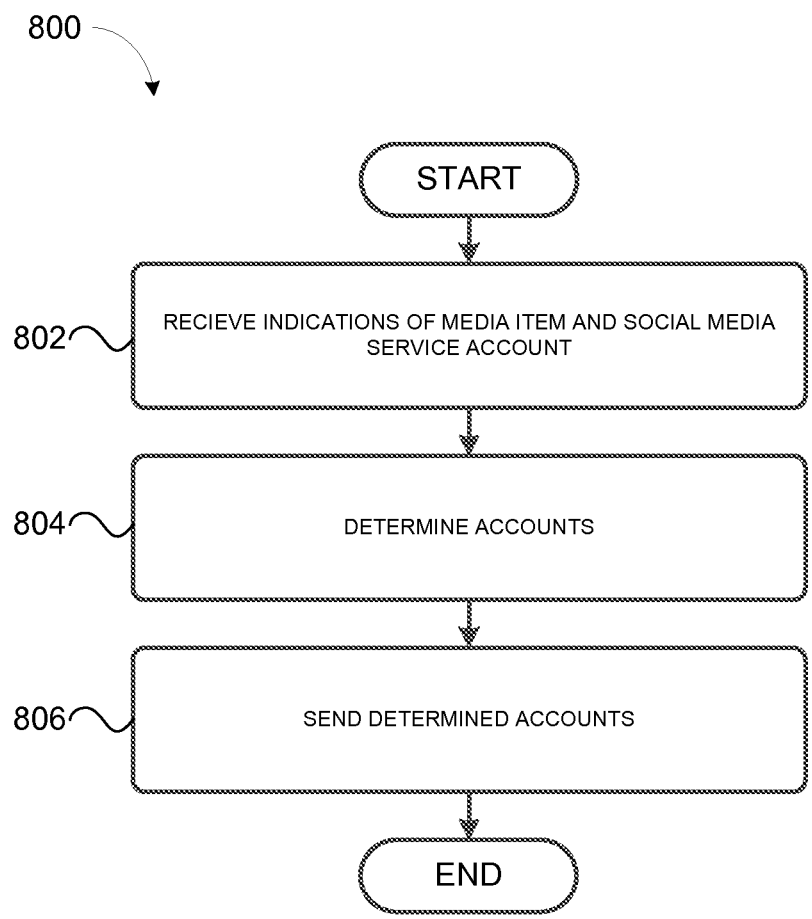
FIG. 8 shows a flow diagram of another example method.

For method 800 of FIG. 8, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the method 800, and other processes and methods disclosed herein, each block in FIG. 8 may represent circuitry that is wired to perform the specific logical functions in the process.

Furthermore, although the blocks are illustrated in sequential order, these blocks may also be performed in parallel, and/or in a different order than those described herein. Also, the various blocks may be combined into fewer blocks, divided into additional blocks, and/or removed based upon the desired implementation.

Figure 9:
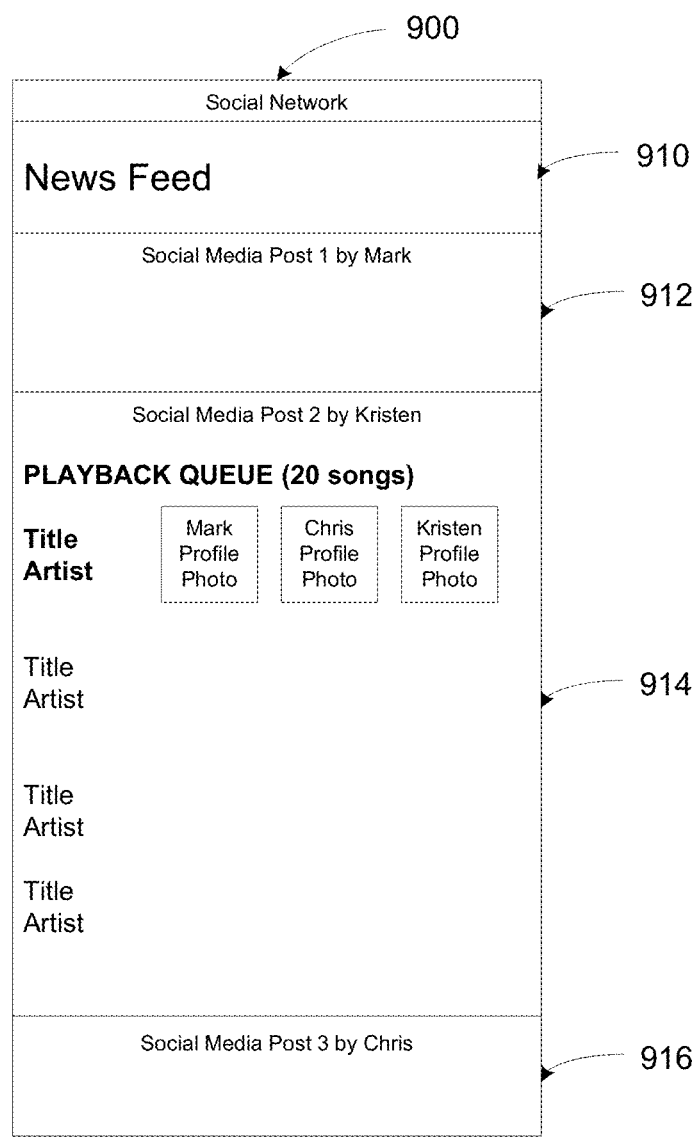
FIG. 9 shows an example social-media interface.

For clarity, the methods may be described herein with reference to FIGS. 1 and 9. It should be understood, however, that this is for purposes of example and explanation only and that the operations of the methods should not be limited by these figures.

a. Receiving Indications of a Particular Media Item and a Particular Account.

At block 802, the method may involve receiving indications of a particular media item and a particular account. In particular, a social-media computing system, such as social media server 130, may receive data representing the indications via a network interface, perhaps from a media playback system, such as media playback system 140 or 142. The social-media computing system may represent one or more computing devices or systems.

More particularly, in some cases, the received indication of a particular media item may be an indication of a particular media item that is currently playing at a media playback system, which may be the media playback system that sent the indication. In some cases, the currently playing media item may be the particular media item discussed above in reference to blocks 602-608.

The received indication of the particular profile may indicate a particular account of the social media service that is registered with the media playback system. As discussed above, an account of a social media service may be registered or otherwise linked to a particular media playback system.

b. Determining One or More Accounts of Social Media Service.

At block 804, the method may involve determining one or more accounts of the social media service. For example, the social-media computing system may determine one or more accounts of the social media service that (i) are connected to the particular account within a social network, and (ii) have played the particular media item on respective media playback systems within a particular period of time.

As noted herein, a social media service may provide a social network that includes various connections between subscriber accounts. Data maintained by the social network may represent the connections for each subscriber. Based on such data, the social-media computing system may determine one or more accounts of the social media service that are connected to the particular account within a social network.

As noted above, a social-media computing system may maintain or have access to playback history data indicating media items that are currently playing at or have been played at the media playback system. Based on such data, the social-media computing system may determine which of the one or more accounts of the social media service that are connected to the particular account within a social network have played the particular media item on respective media playback systems within a particular period of time. The particular period of time may be a day, a week, or any other pre-determined period of time, as noted in connection with block 604.

c. Sending Determined Accounts.

At block 808, the method may involve sending the determined accounts. For instance, the social-media computing system may send an indication of the determined one or more accounts to the media playback system. In some examples, the social-media computing system may send, via a network interface, data indicating the determined one or more accounts to the media playback system. As noted above in connection with block 606, the data may indicate a name or a photo associated with the account, among other examples.

d. Additional Features.

In some cases, the social-media computing system may cause the indication of the determined one or more accounts to be displayed in a social media post by the particular account of the social media service. As noted above, information relating to a subscriber profile may be presented on a subscriber profile in a number of manners, such as through subscriber posts, status updates, blogs, and other uploads. This information may be displayed on a graphical interface in a variety of ways, such as in a social-media webpage or as information presented in a social-media application, among other options.

In some examples, the social-media computing system may cause an indication of a playback queue of one or more media items that are queued for playback at the media playback system to be displayed in the social media posting. Further, social-media computing system may cause the indication of the determined one or more accounts to be displayed in association with the particular media item within the indication of the playback queue.

As an example, FIG. 9 shows an example social-media interface 900 which includes a "news feed" 910. The "news feed" 910 presents social-media postings by various subscriber accounts of the social media service. As shown, the "news feed" 910 includes social-media postings 912, 914, and 916 by different subscribers. Social media posting 914 by Kristen's subscriber profile includes an indication of a playback queue of one or more media items that are queued for playback at particular media playback system that is registered to Kristen's subscriber profile. The playback queue indicates a media playback item that is currently playing back at the media playback system in bold text.

In association with the indication of the particular media item, social media post 914 includes respective pictures associated with Mark, Chris, and Kristen's respective subscriber profiles. The pictures associated with Mark and Chris's subscriber accounts may indicate one or more accounts that are connected to Kristen's profile within the social network and have played the particular media item on respective media playback systems within the particular period of time. In some cases, the picture associated with Kristen's subscriber account may also be displayed as shown, which may indicate that the media playback system registered to her subscriber account also played the particular media item. While pictures have been shown by way of example, the social-media computing system may cause any suitable information that indicates the subscriber accounts to be displayed.

In some cases, a social media service may influence media items that are played back at a media playback system. As noted above, a social-media computing system may maintain or have access to playback history data indicating media items that are currently playing at or have been played at the media playback system. The social-media computing system may additionally maintain or have access to playback preference information (e.g., frequency at which a given media item is played, indications of media items that have been "liked," "favorited" or "starred", etc.). Such information may be stored in a database.

After determining the one or more accounts of the social media service that have played the particular media item, the social-media computing system may determine respective preferred music genres or artists of the determined one or more accounts. For instance, the social-media computing system may query a database containing playback preference information of the determined one or more accounts for genres or artists that are played relatively frequently or otherwise indicated as preferred. One advantage to determining these genres or artists might be that since the subscribers have each listened to the particular media item, the subscribers may share a common appreciation for other music.

The social-media computing system may then influence media items based on the preferred music genres or artists of the determined one or more accounts. Some music streaming services may be configured to provide a customized stream of media items in a radio format based on certain "seed" media items or genres. For example, after providing a music streaming service with "seed" media items or genres, the music streaming service may use a mathematical algorithm to determine other media items having the same or similar attributes as the "seed" media items or genre. An example music streaming service is PANDORA® which uses an algorithm referred to as the MUSIC GENOME PROJECT®.

Accordingly, a streaming media service may provide a customized stream of media items that may include media items that have the same or similar artist or genre as the "seed" media items. The social-media computing system may provide a music streaming services with the preferred music genres or artists of the determined one or more accounts as "seed" media items or genres. Such an operation may cause the music streaming service to provide the media playback system with a stream of media items that are of the preferred music genres or artists.

It will be understood by one of ordinary skill in the art that this disclosure includes numerous other embodiments. While some examples described herein may refer to functions performed by given actors such as "users," "subscribers," and/or other entities, it should be understood that this is for purposes of explanation only. The claims should not be interpreted to require action by any such example actor unless explicitly required by the language of the claims themselves.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, examples provided herein are directed to providing contextual information from a social network around a media item. In one aspect, a method is provided. The method may involve receiving an indication of a particular media item that is currently playing on a media playback system. The method may also involve querying a social network service for one or more accounts of the social network service that (i) are connected within the social network service to a particular account of the social network service that is registered to the media playback system and (ii) have received respective indications of the particular media item from respective media playback systems within a particular period of time. The method may further involve receiving data indicating the queried one or more accounts of the social network service that (i) are connected within the social network service to the particular account of the social network service that is registered to the media playback system and (ii) have received respective indications of the particular media item from respective media playback systems within a particular period of time. The method may involve causing one or more respective indications of the received one or more accounts of the social network service to be displayed on a graphical interface in association with an indication of the particular media item.

In another aspect, a computing device is provided. The computing device includes a network interface, at least one processor, a data storage, and a program logic stored in the data storage and executable by the at least one processor to perform operations. The operations may include receiving an indication of a particular media item that is currently playing on a media playback system. The operations may also include querying a social network service for one or more accounts of the social network service that (i) are connected within the social network service to a particular account of the social network service that is registered to the media playback system and (ii) have received respective indications of the particular media item from respective media playback systems within a particular period of time. The operations may further include receiving data indicating the queried one or more accounts of the social network service that (i) are connected within the social network service to the particular account of the social network service that is registered to the media playback system and (ii) have received respective indications of the particular media item from respective media playback systems within a particular period of time. The operations may include causing one or more respective indications of the received one or more accounts of the social network service to be displayed on a graphical interface in association with an indication of the particular media item.

In yet another aspect, a non-transitory computer-readable medium is provided. The non-transitory computer-readable medium having instructions stored thereon that are executable by a computing device of a media playback system to cause the computing device to perform operations. The operations may include receiving an indication of a particular media item that is currently playing on a media playback system. The operations may also include querying a social network service for one or more accounts of the social network service that (i) are connected within the social network service to a particular account of the social network service that is registered to the media playback system and (ii) have received respective indications of the particular media item from respective media playback systems within a particular period of time. The operations may further include receiving data indicating the queried one or more accounts of the social network service that (i) are connected within the social network service to the particular account of the social network service that is registered to the media playback system and (ii) have received respective indications of the particular media item from respective media playback systems within a particular period of time. The operations may include causing one or more respective indications of the received one or more accounts of the social network service to be displayed on a graphical interface in association with an indication of the particular media item.

In another aspect, another method is provided. The method may involve receiving indications of (i) a particular media item currently playing at a media playback system, and (ii) a particular account of a social network service that is registered with the media playback system. The method may also involve determining one or more accounts of the social network service that (i) are connected to the particular account within the social network service, and (ii) have played the particular media item on respective media playback systems within a particular period of time. The method may further involve sending an indication of the determined one or more accounts to the media playback system.

In a further aspect, a computing system is provided. The computing system includes a network interface, at least one processor, a data storage, and a program logic stored in the data storage and executable by the at least one processor to perform operations. The operations may include receiving indications of (i) a particular media item currently playing at a media playback system, and (ii) a particular account of a social network service that is registered with the media playback system. The operations may also include determining one or more accounts of the social network service that (i) are connected to the particular account within the social network service, and (ii) have played the particular media item on respective media playback systems within a particular period of time. The operations may further include sending an indication of the determined one or more accounts to the media playback system.

In yet another aspect, a non-transitory computer-readable medium is provided. The non-transitory computer-readable medium having instructions stored thereon that are executable by a computing system to cause the computing system to perform operations. The operations may include receiving indications of (i) a particular media item currently playing at a media playback system, and (ii) a particular account of a social network service that is registered with the media playback system. The operations may also include determining one or more accounts of the social network service that (i) are connected to the particular account within the social network service, and (ii) have played the particular media item on respective media playback systems within a particular period of time. The operations may further include sending an indication of the determined one or more accounts to the media playback system.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A computing device comprising:
   a network interface;
   at least one processor;
   a data storage; and
   a program logic stored in the data storage and executable by the at least one processor to:
      receive, via the network interface from a given playback device of a media playback system, one or more state variables indicating a playback queue that is being played back by one or more playback devices of the media playback system, wherein the playback queue includes a particular media item;
      query, via the network interface, one or more cloud servers of a social media service for one or more accounts of the social media service that (i) are connected within a social network to a particular account of the social media service that is registered to the media playback system and (ii) have previously played back the particular media item on respective media playback systems within a particular period of time preceding a current playback session of the one or more playback devices;
      based on the querying of the social media service, receive, via the network interface from at least one cloud server of the social media service, data indicating the queried one or more accounts of the social media service; and
      while the one or more playback devices are playing back the particular media item, cause, on a graphical interface, display of one or more respective indications of the queried one or more accounts of the social media service in association with an indication of the particular media item, wherein each of the one or more respective indications of the queried one or more accounts of the social media service comprises a respective indication of a respective historical time frame in which an account of the queried one or more accounts initiated playback of the particular media item on a respective media playback system.

2. The computing device of claim 1, wherein causing, on the graphical interface, display of the one or more respective indications of the queried one or more accounts of the social media service in association with the indication of the particular media item comprises:
   causing, on the graphical interface, display of a graphical representation of the playback queue that is being played back by one or more playback devices of the media playback system; and
   causing, on the graphical interface, display of the one or more respective indications of the queried one or more accounts of the social media service in association with the indication of the particular media item within the displayed playback queue.

3. The computing device of claim 1, wherein causing, on the graphical interface, display of the one or more respective indications of the queried one or more accounts of the social media service in association with the indication of the particular media item comprises:
   causing, on the graphical interface, display of one or more respective indications of the respective media playback systems in association with an indication of the particular media item.

4. The computing device of claim 1, wherein causing, on the graphical interface, display of the one or more respective indications of the queried one or more accounts of the social media service in association with the indication of the particular media item comprises:
   causing, on the graphical interface, display of indications of one or more respective names registered with the queried one or more accounts of the social media service in association with the indication of the particular media item.

5. The computing device of claim 1, wherein causing, on the graphical interface, display of the one or more respective indications of the queried one or more accounts of the social media service in association with the indication of the particular media item comprises:
   causing, on the graphical interface, display of one or more respective pictures associated with the queried one or more accounts of the social media service in association with the indication of the particular media item.

6. The computing device of claim 5, wherein each of the one or more respective pictures comprises a thumbnail photograph of a picture designated by the account as a profile picture to be displayed on the social media service in association with the account.

7. The computing device of claim 1, wherein querying the one or more cloud servers of the social media service for one or more accounts of the social media service comprises:
sending, via the network interface to the one or more cloud servers, (i) a track identification that uniquely identifies the particular media item among a plurality of media items of a media streaming service, (ii) an indication of the media streaming service, and (iii) an indication of the particular account that is registered to the social media service; and
requesting, from the one or more cloud servers via the network interface, the one or more accounts of the social media service that (i) are connected within the social media service to the particular account of the social media service that is registered to the media playback system, and (ii) have initiated playback of the particular media item on respective media playback systems within the particular period of time preceding the current playback session of the one or more playback devices.

8. A computing device comprising:
a network interface;
at least one processor;
a data storage; and
a program logic stored in the data storage and executable by the at least one processor to:
receive, via the network interface from a given playback device of a media playback system, one or more state variables indicating a playback queue that is being played back by one or more playback devices of the media playback system, wherein the playback queue includes a particular media item;
query, via the network interface, one or more cloud servers of a social media service for one or more accounts of the social media service that (i) are connected within a social network to a particular account of the social media service that is registered to the media playback system and (ii) have previously played back the particular media item on respective media playback systems within a particular period of time preceding a current playback session of the one or more playback devices;
based on the querying of the social media service, receive, via the network interface from at least one cloud server of the social media service, data indicating the queried one or more accounts of the social media service; and
while the one or more playback devices are playing back the particular media item, cause, on a graphical interface, display of one or more respective indications of the queried one or more accounts of the social media service in association with an indication of the particular media item, wherein each of the one or more respective indications of the queried one or more accounts of the social media service comprises a respective indication of a respective historical time frame in which an account of the queried one or more accounts initiated playback of the particular media item on a respective media playback system.

9. The computing device of claim 8, wherein causing, on the graphical interface, display of the one or more respective indications of the queried one or more accounts of the social media service in association with the indication of the particular media item comprises:
causing, on the graphical interface, display of a graphical representation of the playback queue that is being played back by one or more playback devices of the media playback system; and
causing, on the graphical interface, display of the one or more respective indications of the queried one or more accounts of the social media service in association with the indication of the particular media item within the displayed playback queue.

10. The computing device of claim 8, wherein causing, on the graphical interface, display of the one or more respective indications of the queried one or more accounts of the social media service in association with the indication of the particular media item comprises:
causing, on the graphical interface, display of one or more respective indications of the respective media playback systems in association with an indication of the particular media item.

11. The computing device of claim 8, wherein causing, on the graphical interface, display of the one or more respective indications of the queried one or more accounts of the social media service in association with the indication of the particular media item comprises:
causing, on the graphical interface, display of indications of one or more respective names registered with the queried one or more accounts of the social media service in association with the indication of the particular media item.

12. The computing device of claim 8, wherein causing, on the graphical interface, display of the one or more respective indications of the queried one or more accounts of the social media service in association with the indication of the particular media item comprises:
causing, on the graphical interface, display of one or more respective pictures associated with the received one or more accounts of the social media service in association with the indication of the particular media item.

13. The computing device of claim 12, wherein each of the one or more respective pictures comprises a thumbnail photograph of a picture designated by the account as a profile picture to be displayed on the social media service in association with the account.

14. A method comprising:
receiving, via network interface of a social-media computing system of a social media service, indications of (i) a particular media item currently playing at a media playback system, and (ii) a particular account of the social media service that is registered with the media playback system;
determining, via the social-media computing system, one or more accounts of the social media service that (i) are connected to the particular account within a social network, and (ii) have played the particular media item on respective media playback systems within a particular period of time preceding a current playback session of the media playback system; and
sending, via the network interface of the social-media computing system, an indication of the determined one or more accounts to the media playback system, wherein the indication of the determined one or more accounts comprises an indication of a respective historical time frame in which one or more respective accounts initiated playback of the particular media item on a respective media playback system.

15. The method of claim 14, further comprising:
causing display of the indication of the determined one or more accounts in a social media post that is associated with the particular account of the social media service.

16. The method of claim 15, wherein causing display of the indication of the determined one or more accounts in the social media post that is associated with the particular account of the social media service comprises:
causing display of the indication of the determined one or more accounts in the social media post by the particular account of the social media service.

17. The method of claim 15, wherein causing display of the indication of the determined one or more accounts in the social media post that is associated with the particular account of the social media service comprises:
causing display of an indication of a playback queue of one or more media items that are queued for playback at the media playback system in the social media post, wherein the playback queue includes the particular media item; and
causing display of the indication of the determined one or more accounts in association with the particular media item within the indication of the playback queue.

18. The method of claim 14, further comprising:
after determining the one or more accounts of the social media service, querying a database for data indicating respective preferred music genres of the determined one or more accounts; and
causing a music streaming service to provide the media playback system with a stream of media items that are of the preferred music genres.

19. The method of claim 14, further comprising:
after determining the one or more accounts of the social media service, querying a database for data indicating respective preferred music artists of the determined one or more accounts; and
causing a music streaming service to provide the media playback system with a stream of media items that are of the preferred music artists.

20. The computing device of claim 1, wherein the playback session began when playback of the playback queue was initiated on the one or more playback devices.

* * * * *